United States Patent
Ahn et al.

(10) Patent No.: US 9,100,178 B2
(45) Date of Patent: Aug. 4, 2015

(54) METHOD AND DEVICE FOR TRANSMITTING EXTENDED UPLINK CONTROL INFORMATION IN WIRELESS COMMUNICATION SYSTEM

(75) Inventors: Joonkui Ahn, Anyang-si (KR);
Dongyoun Seo, Anyang-si (KR);
Mingyu Kim, Anyang-si (KR);
Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 13/577,127

(22) PCT Filed: Jul. 26, 2011

(86) PCT No.: PCT/KR2011/005493
§ 371 (c)(1),
(2), (4) Date: Aug. 3, 2012

(87) PCT Pub. No.: WO2012/015214
PCT Pub. Date: Feb. 2, 2012

(65) Prior Publication Data
US 2012/0294273 A1  Nov. 22, 2012

Related U.S. Application Data

(60) Provisional application No. 61/367,843, filed on Jul. 26, 2010, provisional application No. 61/368,649, filed on Jul. 28, 2010, provisional application No. 61/374,273, filed on Aug. 17, 2010.

(51) Int. Cl.
*H04L 1/18* (2006.01)
*H04L 27/26* (2006.01)
(Continued)

(52) U.S. Cl.
CPC ............ *H04L 1/1671* (2013.01); *H04L 1/0028* (2013.01); *H04L 1/1854* (2013.01); *H04J 13/0059* (2013.01)

(58) Field of Classification Search
USPC .................. 370/329, 229, 232–235
IPC ............ H04L 5/007, 5/0023, 5/0048, 5/0053, H04L 5/0055, 1/0061, 1/007, 1/1671, 27/2607, H04L 27/2601, 25/03898; H04W 28/04, H04W 24/10, 72/00, 72/04, 72/0406, 72/1284; H04B 1/73; H04J 3/0062, 3/18
See application file for complete search history.

(56) References Cited

U.S. PATENT DOCUMENTS

2009/0180433 A1 * 7/2009 Ahn et al. ................ 370/329
2010/0091708 A1   4/2010 Nishikawa et al.
(Continued)

FOREIGN PATENT DOCUMENTS

KR  10-2009-0112748 A   10/2009
KR  10-2010-0073992 A   7/2010
(Continued)

OTHER PUBLICATIONS

3GPP, "Technical Specification Group Radio Access Network; Evolved Universal Terrestrial Radio Access (E-UTRA); Physical layers procedures (Release 8)", 3GPP TS 36.213 V8.8.0, pp. 1-77, Sep. 2009.
(Continued)

*Primary Examiner* — Andrew Chriss
*Assistant Examiner* — John Lequang
(74) *Attorney, Agent, or Firm* — Birch, Stewart, Kolasch & Birch, LLP

(57) ABSTRACT

A method and apparatus are described for transmitting and receiving uplink control information. A base station transmits allocation information to a user equipment. The allocation information allocates a plurality of physical uplink control channel (PUCCH) transmission resources, which include a plurality of reference signal (RS) resources, to the user equipment. Each of the PUCCH transmission resources is configured by a combination of an information resource and a reference signal (RS) resource. Positive acknowledgement/negative acknowledgement (ACK/NACK) information, an RS and additional control information are received by the base station from the user equipment through a specific information resource and a specific RS resource among the plurality of PUCCH transmission resources. A state of the additional control information is indicated based on a selection made by the user equipment of the specific RS resource to which the RS is transmitted, among the plurality of RS resources.

8 Claims, 17 Drawing Sheets

(51) Int. Cl.
*H04W 24/00* (2009.01)
*H04W 28/02* (2009.01)
*H04L 1/16* (2006.01)
*H04L 1/00* (2006.01)
*H04J 13/00* (2011.01)

(56) References Cited

U.S. PATENT DOCUMENTS

2010/0135273 A1* 6/2010 Kim .................... 370/344
2011/0013581 A1* 1/2011 Lee et al. ............ 370/329
2011/0211546 A1* 9/2011 Hooli et al. ......... 370/329
2011/0242997 A1* 10/2011 Yin .................... 370/252
2011/0261776 A1 10/2011 Ahn et al.
2011/0274099 A1* 11/2011 Kwon et al. ........ 370/338
2011/0292900 A1* 12/2011 Ahn et al. ........... 370/329
2012/0039291 A1* 2/2012 Kwon et al. ........ 370/329

FOREIGN PATENT DOCUMENTS

WO   WO 2009/022866 A1   2/2009
WO   WO 2009/113836 A1   9/2009
WO   WO 2010/060455 A1   6/2010

OTHER PUBLICATIONS

3GPP, "Technical Specification Group Radio Access Network; Further advancements for E-UTRA; LTE-Advanced feasibility studies in RAN WG4 (Release 9)", 3GPP TR 36.815 V9.0.0, pp. 1-44, Mar. 2010.

* cited by examiner

FIG. 13

|     | OC1 | OC2 | OC3 |
|-----|-----|-----|-----|
| CS1 |     |     |     |
| CS2 |     |     |     |
| CS3 |     |     |     |
| CS4 |     |     |     |
| CS5 |     |     |     |
| CS6 |     |     |     |
| CS7 |     |     |     |
| CS8 |     |     |     |
| CS9 |     |     |     |
| CS10 |    |     |     |
| CS11 |    |     |     |
| CS12 |    |     |     |

(a) RS part

|     | OC1 | OC2 | OC3 | OC4 |
|-----|-----|-----|-----|-----|
| CS1 |     |     |     |     |
| CS2 |     |     |     |     |
| CS3 |     |     |     |     |
| CS4 |     |     |     |     |
| CS5 |     |     |     |     |
| CS6 |     |     |     |     |
| CS7 |     |     |     |     |
| CS8 |     |     |     |     |
| CS9 |     |     |     |     |
| CS10 |    |     |     |     |
| CS11 |    |     |     |     |
| CS12 |    |     |     |     |

(b) Data part

FIG. 14

|     | OC1 | OC2 | OC3 |
|-----|-----|-----|-----|
| CS1 | /// | /// | /// |
| CS2 |     |     |     |
| CS3 |     |     |     |
| CS4 |     |     |     |
| CS5 |     |     |     |
| CS6 |     |     |     |
| CS7 |     |     |     |
| CS8 |     |     |     |
| CS9 |     |     |     |
| CS10 |    |     |     |
| CS11 |    |     |     |
| CS12 |    |     |     |

(a) RS part

|     | OC1 | OC2 | OC3 | OC4 |
|-----|-----|-----|-----|-----|
| CS1 | /// | /// | /// | /// |
| CS2 |     |     |     |     |
| CS3 |     |     |     |     |
| CS4 |     |     |     |     |
| CS5 |     |     |     |     |
| CS6 |     |     |     |     |
| CS7 |     |     |     |     |
| CS8 |     |     |     |     |
| CS9 |     |     |     |     |
| CS10 |    |     |     |     |
| CS11 |    |     |     |     |
| CS12 |    |     |     |     |

(b) Data part

|  | OC1 | OC2 | OC3 |
|---|---|---|---|
| CS1 | ///  |  | /// |
| CS2 |  | /// |  |
| CS3 |  |  |  |
| CS4 |  |  |  |
| CS5 |  |  |  |
| CS6 |  |  |  |
| CS7 |  |  |  |
| CS8 |  |  |  |
| CS9 |  |  |  |
| CS10 |  |  |  |
| CS11 |  |  |  |
| CS12 |  |  |  |

(a) RS part

|  | OC1 | OC2 | OC3 | OC4 |
|---|---|---|---|---|
| CS1 | /// |  | /// |  |
| CS2 |  | /// |  | /// |
| CS3 |  |  |  |  |
| CS4 |  |  |  |  |
| CS5 |  |  |  |  |
| CS6 |  |  |  |  |
| CS7 |  |  |  |  |
| CS8 |  |  |  |  |
| CS9 |  |  |  |  |
| CS10 |  |  |  |  |
| CS11 |  |  |  |  |
| CS12 |  |  |  |  |

(b) Data part

FIG. 18

|  | OC1 | OC2 | OC3 |
|---|---|---|---|
| CS1 | /// |  |  |
| CS2 | /// |  |  |
| CS3 | /// |  |  |
| CS4 | /// |  |  |
| CS5 |  |  |  |
| CS6 |  |  |  |
| CS7 |  |  |  |
| CS8 |  |  |  |
| CS9 |  |  |  |
| CS10 |  |  |  |
| CS11 |  |  |  |
| CS12 |  |  |  |

(a) RS part

|  | OC1 | OC2 | OC3 | OC4 |
|---|---|---|---|---|
| CS1 | /// |  |  |  |
| CS2 | /// |  |  |  |
| CS3 | /// |  |  |  |
| CS4 | /// |  |  |  |
| CS5 |  |  |  |  |
| CS6 |  |  |  |  |
| CS7 |  |  |  |  |
| CS8 |  |  |  |  |
| CS9 |  |  |  |  |
| CS10 |  |  |  |  |
| CS11 |  |  |  |  |
| CS12 |  |  |  |  |

(b) Data part

METHOD AND DEVICE FOR TRANSMITTING EXTENDED UPLINK CONTROL INFORMATION IN WIRELESS COMMUNICATION SYSTEM

CROSS-REFERENCE TO RELATED APPLICATIONS

This application is the National Phase of PCT/KR2011/005493 filed on Jul. 26, 2011, which claims priority under 35 U.S.C. 119(e) to U.S. Provisional Application No. 61/367,843 filed on Jul. 26, 2010, U.S. Provisional Application No. 61/368,649 filed on Jul. 28, 2010 and U.S. Provisional Application No. 61/374,273 filed on Aug. 17, 2010, all of which are hereby expressly incorporated by reference into the present application.

TECHNICAL FIELD

The present invention relates to a wireless communication system, and more particularly to a method and a device for transmitting extended uplink control information in a wireless communication system.

BACKGROUND ART

Uplink control information may include scheduling request, acknowledgement (positive acknowledgement/non-acknowledgement (ACK/NACK)) information for downlink transmission, downlink channel status information, etc. In this case, the ACK/NACK information for downlink transmission is the control information fed back from a downlink receiving entity to a downlink transmitting entity depending on success of decoding of downlink data. In more detail, if the downlink receiving entity successfully performs decoding of downlink data, it may feed ACK information back to the downlink transmitting entity. If not so, the downlink receiving entity may feed NACK information back to the downlink transmitting entity.

Meanwhile, the introduction of a multiple carrier technique has been considered to support the more extended bandwidth than the related art bandwidth. The multiple carrier technique may be referred to as the carrier aggregation technique. In a general wireless communication system according to the related art, one carrier is only used on an uplink and a downlink, whereas the multiple carrier technique is intended that a plurality of carriers are grouped physically in a frequency domain to support an extended bandwidth, whereby a frequency bandwidth of a logically great band may be used. If the multiple carrier technique is applied to downlink transmission, a plurality of downlink data may be transmitted through a plurality of downlink data channels on a plurality of downlink carriers (or downlink cell (DL cell)) at a specific time. Accordingly, the downlink receiving entity may be required to feed a plurality of kinds of ACK/NACK information on a plurality of downlink data back to the downlink transmitting entity.

Alternatively, a time division duplex (TDD) system in which downlink transmission and reception and uplink transmission and reception are performed at respective time periods (for example, subframe), it may be required that a plurality of kinds of ACK/NACK information on a plurality of downlink data transmitted from a plurality of downlink subframes should be fed back.

DISCLOSURE

Technical Problem

In the wireless communication system according to the related art, if uplink ACK/NACK information is transmitted through a physical uplink control channel, ACK/NACK information of 1 bit or 2 bits is only transmitted. Accordingly, in order to transmit ACK/NACK information on a plurality of downlink data in a multiple carrier system or TDD system as described above, it is required that ACK/NACK transmission resources should be defined to use more bits for ACK/NACK information transmission. Also, transmission of additional uplink control information (for example, scheduling request) may be required together with transmission of extended ACK/NACK information. Since only uplink control information of a limited size can be transmitted in accordance with the existing uplink control information transmission system, a new method for using uplink transmission resources will be required for transmission of extended uplink control information.

Accordingly, an object of the present invention devised to solve the conventional problem is to provide a method and a device for transmitting various kinds of uplink control information efficiently and exactly by defining a method for transmitting extended uplink control information.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for a base station receiving uplink control information from a user equipment comprises the steps of transmitting allocation information to the user equipment, the allocation information allocating a plurality of physical uplink control channel (PUCCH) transmission resources, which include a plurality of reference signal (RS) resources, to the user equipment, each of the PUCCH transmission resources being configured by combination of an information resource and a reference signal (RS) resource; and receiving ACK/NACK information, RS, and additional control information, which are transmitted from the user equipment through a specific information resource and a specific RS resource among the plurality of PUCCH transmission resources, wherein the additional control information is indicated based on selection of the specific RS resource to which the RS is transmitted, among the plurality of RS resources.

To solve the aforementioned technical problems, according to another embodiment of the present invention, a method for a user equipment transmitting uplink control information to a base station comprises the steps of receiving allocation information from the base station, the allocation information allocating a plurality of physical uplink control channel (PUCCH) transmission resources, which include a plurality of reference signal (RS) resources, to the user equipment, each of the PUCCH transmission resources being configured by combination of an information resource and a reference signal (RS) resource; and transmitting ACK/NACK information, RS, and additional control information to the base station through a specific information resource and a specific RS resource among the plurality of PUCCH transmission resources, wherein the additional control information is indicated based on selection of the specific RS resource to which the RS is transmitted, among the plurality of RS resources.

To solve the aforementioned technical problems, according to still another embodiment of the present invention, a base station receiving uplink control information comprises a transmission module transmitting a downlink signal to a user equipment; a reception module receiving an uplink signal from the user equipment; and a processor controlling the base station which includes the reception module and the transmission module, wherein the processor transmits allocation information to the user equipment through the transmission module, the allocation information allocating a plurality of physical uplink control channel (PUCCH) transmission resources, which include a plurality of reference signal (RS) resources, to the user equipment, each of the PUCCH transmission resource being configured by combination of an information resource and a reference signal (RS) resource, and is configured to receive ACK/NACK information, RS, and additional control information, which are transmitted from the user equipment through a specific information resource and a specific RS resource among the plurality of PUCCH transmission resources, through the reception module, and the additional control information is indicated based on selection of the specific RS resource to which the RS is transmitted, among the plurality of RS resources.

To solve the aforementioned technical problems, according to further still another embodiment of the present invention, a user equipment transmitting uplink control information comprises a transmission module transmitting an uplink signal to a base station; a reception module receiving a downlink signal from the base station; and a processor controlling the user equipment which includes the reception module and the transmission module, wherein the processor receives allocation information from the base station through the reception module, the allocation information allocating a plurality of physical uplink control channel (PUCCH) transmission resources, which include a plurality of reference signal (RS) resources, to the user equipment, each of the PUCCH transmission resources being configured by combination of an information resource and a reference signal (RS) resource, and is configured to transmit ACK/NACK information, RS, and additional control information to the base station through a specific information resource and a specific RS resource among the plurality of PUCCH transmission resources, through the transmission module, and the additional control information is indicated based on selection of the specific RS resource to which the RS is transmitted, among the plurality of RS resources.

The following matters may commonly be applied to the aforementioned embodiments of the present invention.

When the additional control information is indicated based on selection of the specific RS resource among the plurality of RS resources, a first state of the additional control information may be indicated if the specific RS resource is the first RS resource of the plurality of RS resources, and a second state of the additional control information may be indicated if the specific RS resource is the second RS resource of the plurality of RS resources.

Alternatively, when the additional control information is indicated based on selection of the specific RS resource among the plurality of RS resources, a first state of the additional control information may be indicated if the PUCCH transmission resource to which the specific RS resource belongs is different from the PUCCH transmission resource to which the specific information resource belongs, and a second state of the additional control information may be indicated if the PUCCH transmission resource to which the specific RS resource belongs is the same as the PUCCH transmission resource to which the specific information resource belongs.

The additional control information may be scheduling request (SR), the first state may represent that scheduling request is unsolicited from the user equipment, and the second state may represent that scheduling request is solicited from the user equipment.

One RS resource may be determined by combination of a location of a resource block (RB) to which the RS is transmitted, a cyclic shift (CS) value applied to the RS in a frequency domain. In this case, orthogonal spreading code (OC) applied to the RS in a time domain, and at least one of the RB, the CS, and the OC may differently be given for each of the plurality of RS resources.

When the additional control information is indicated based on selection of the specific RS resource among the plurality of RS resources, the plurality of RS resources allocated to the user equipment may be allocated to other user equipments.

The aforementioned embodiments and the following detailed description of the present invention are only exemplary, and are for additional description of the present invention cited in claims.

Advantageous Effects

According to the present invention, a method and a device for transmitting various kinds of uplink control information efficiently and exactly may be provided by defining a method for transmitting extended uplink control information.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a diagram illustrating PUCCH resources that may be allocated to one user equipment;

FIG. 14 to FIG. 20 are diagrams illustrating examples of allocation of a plurality of PUCCH resources to one user equipment;

BEST MODE FOR CARRYING OUT THE INVENTION

Figure 1:
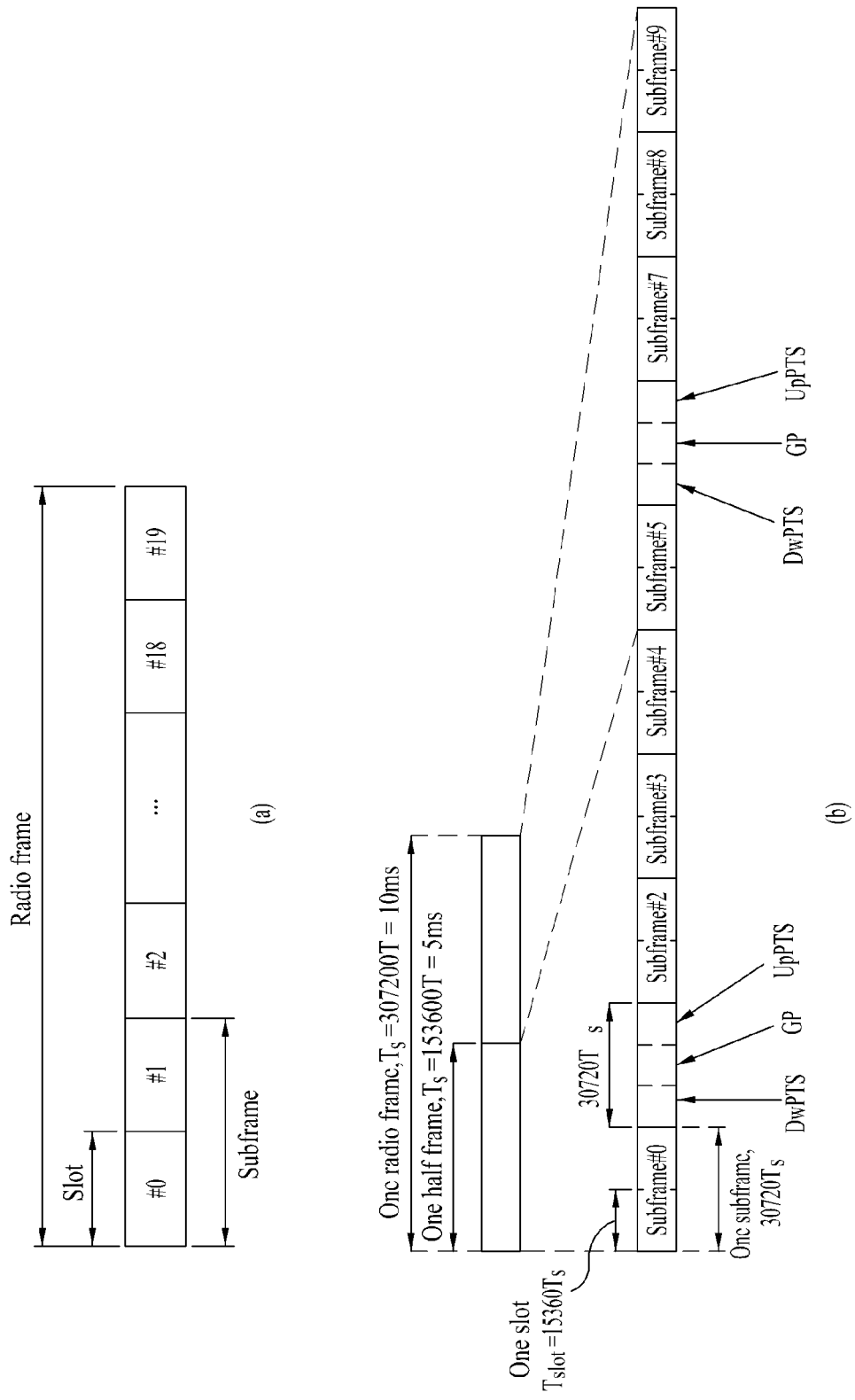
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on data transmission and reception between a base station and a user equipment. In this case, the base station means a terminal node of a network, which performs direct communication with the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station.

Also, in this specification, the base station (BS) may be replaced with terms such as a fixed station, Node B, eNode B (eNB), and an access point (AP). A relay may be replaced with a relay node (RN) or a relay station (RS). Also, a terminal may be replaced with terms such as a user equipment (UE), a mobile station (MS), a mobile subscriber station (MSS), or a subscriber station (SS).

Also, specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE and LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as code division multiple access (CDMA), frequency division multiple access (FDMA), time division multiplex access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA on a downlink and SC-FDMA on an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE system and the 3GPP LTE-A system.

A structure of a downlink radio frame will be described with reference to FIG. 1. In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(*a*) is a diagram illustrating a structure of a type 1 radio frame. The downlink radio frame includes 10 subframes, each of which includes two slots. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since OFDMA is used on a downlink in the 3GPP LTE system, the OFDM symbols represent one symbol interval. The OFDM symbols may be referred to as SC-FDMA symbols or symbol interval. A resource block as a resource allocation unit may include a plurality of continuous subcarriers at one slot.

The number of OFDM symbols included in one slot may be varied depending on configuration of cyclic prefix (CP). Examples of the CP include extended CP and normal CP. For example, if the OFDM symbols are configured by normal CP, the number of OFDM symbols included in one slot may be 7. If the OFDM symbols are configured by extended CP, since the length of one OFDM symbol is increased, the number of OFDM symbols included in one slot is smaller than that of OFDM symbols in case of normal CP. In case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of the subframes includes two slots. The DwPTS is used for initial cell search at a user equipment, synchronization or channel estimation. The UpPTS is used for channel estimation at a base station and uplink transmission synchronization of the user equipment. The guard period is to remove interference occurring in the uplink due to multi-path delay of a downlink signal between the uplink and the downlink.

The structure of the radio frame is only exemplary, and various modifications may be made in the number of subframes included in the radio frame, the number of slots included in the subframe, or the number of symbols included in the slot.

Figure 2:
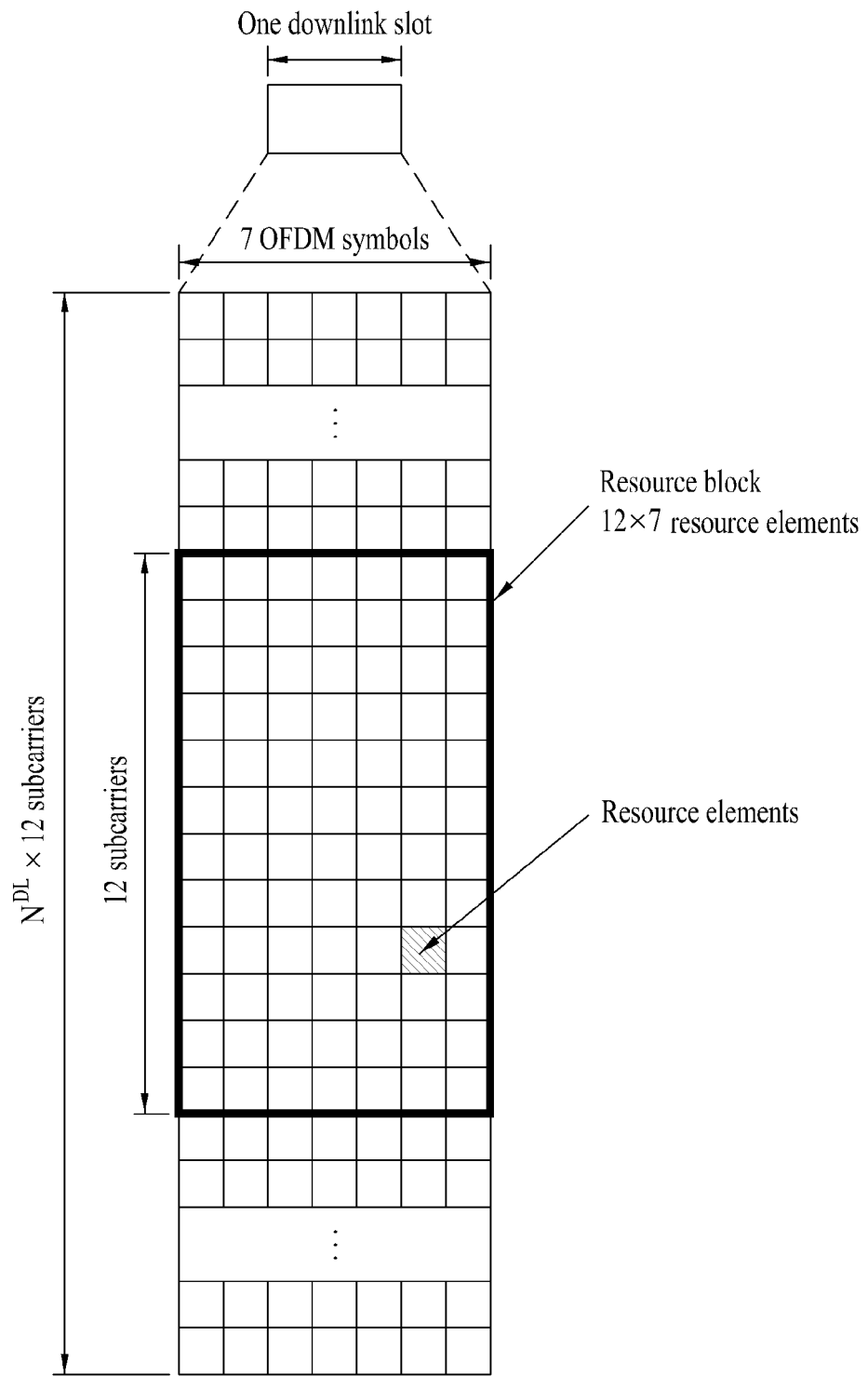
FIG. 2 is a diagram illustrating a resource grid at a downlink slot.

FIG. 2 is a diagram illustrating an example of a resource grid at a downlink slot. One downlink slot includes, but not limited to, seven OFDM symbols in a time domain, and one resource block (RB) includes, but not limited to, twelve subcarriers in a frequency domain. For example, in case of the normal CP, one slot includes seven OFDM symbols. However, in case of the extended CP, one slot may include six OFDM symbols. Each element on the resource grid will be referred to as a resource element (RE). One resource block includes 12×7 resource elements. The number $N^{DL}$ of resource blocks included in the downlink slot depends on a downlink transmission bandwidth. A structure of an uplink slot may be the same as that of the downlink slot.

Figure 3:
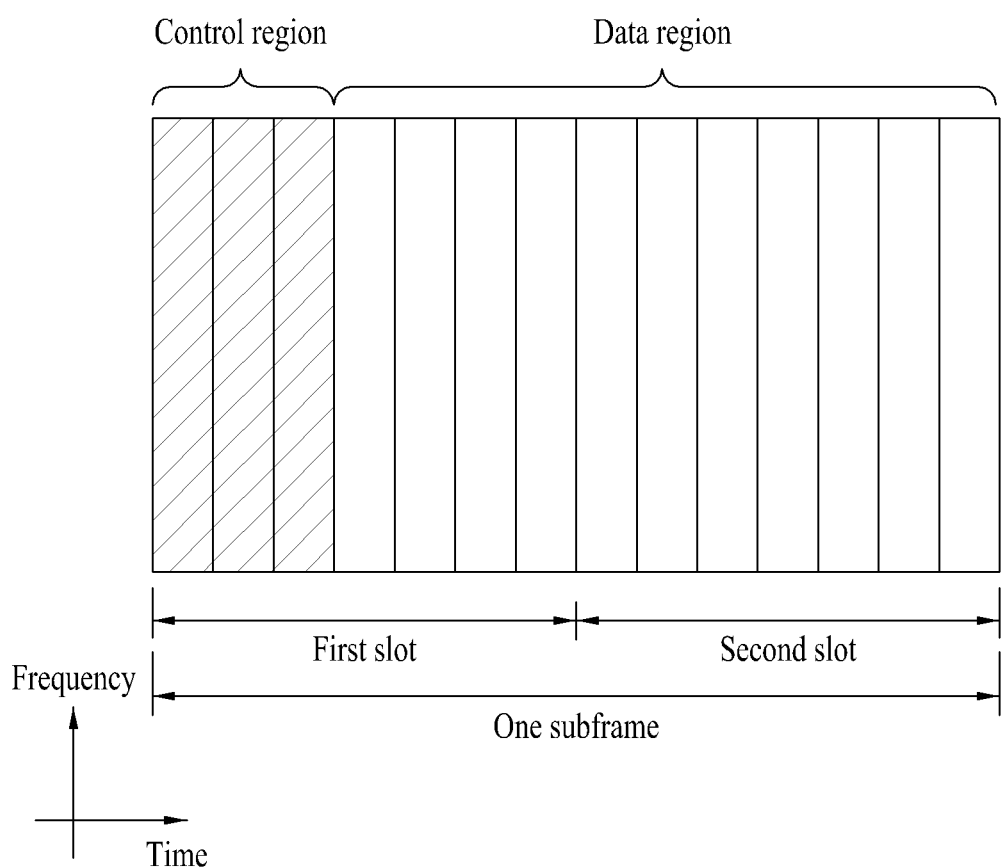
FIG. 3 is a diagram illustrating a structure of a downlink sub frame.

FIG. 3 is a diagram illustrating a structure of a downlink subframe. Maximum three OFDM symbols located at the front of the first slot within one subframe correspond to a control region to which a control channel is allocated. The other OFDM symbols correspond to a data region to which a physical downlink shared channel (PDSCH) is allocated. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and includes information on the number of OFDM symbols used for transmission of the control channel within the subframe. The PHICH includes HARQ ACK/NACK (acknowledgement/negative-acknowledgement) signals in response to uplink transmission. The control information transmitted through the PDCCH will be referred to as downlink control information (DCI).

The DCI includes uplink or downlink scheduling information, or uplink transmission (Tx) power control command for a random user equipment group. The PDCCH may include transport format and resource allocation information of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control information, and activity information of voice over Internet protocol (VoIP). A plurality of PDCCHs may be transmitted within the control region. The user equipment may monitor the plurality of PDCCHs. The PDCCH is transmitted by aggregation of one or more continuous control channel elements (CCEs). The CCE is a logic allocation unit used to provide the PDCCH at a coding rate based on the status of a radio channel. The CCE corresponds to a plurality of resource element groups (REGs). For example, one CCE may correspond to 36 subcarriers. The format of the PDCCH and the number of available bits of the PDCCH are determined depending on the correlation between the number of CCEs and a coding rate provided by the CCE. A base station determines a PDCCH format depending on the DCI transmitted to the user equipment, and attaches cyclic redundancy check (CRC) to the control information. The CRC is masked with an identifier (for example, radio network temporary identifier (RNTI)) depending on owner or usage of the PDCCH. If the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). In order to represent a random access response which is the response to transmission of a random access preamble of the user equipment, the CRC may be masked with a random access RNTI (RA-RNTI).

Figure 4:
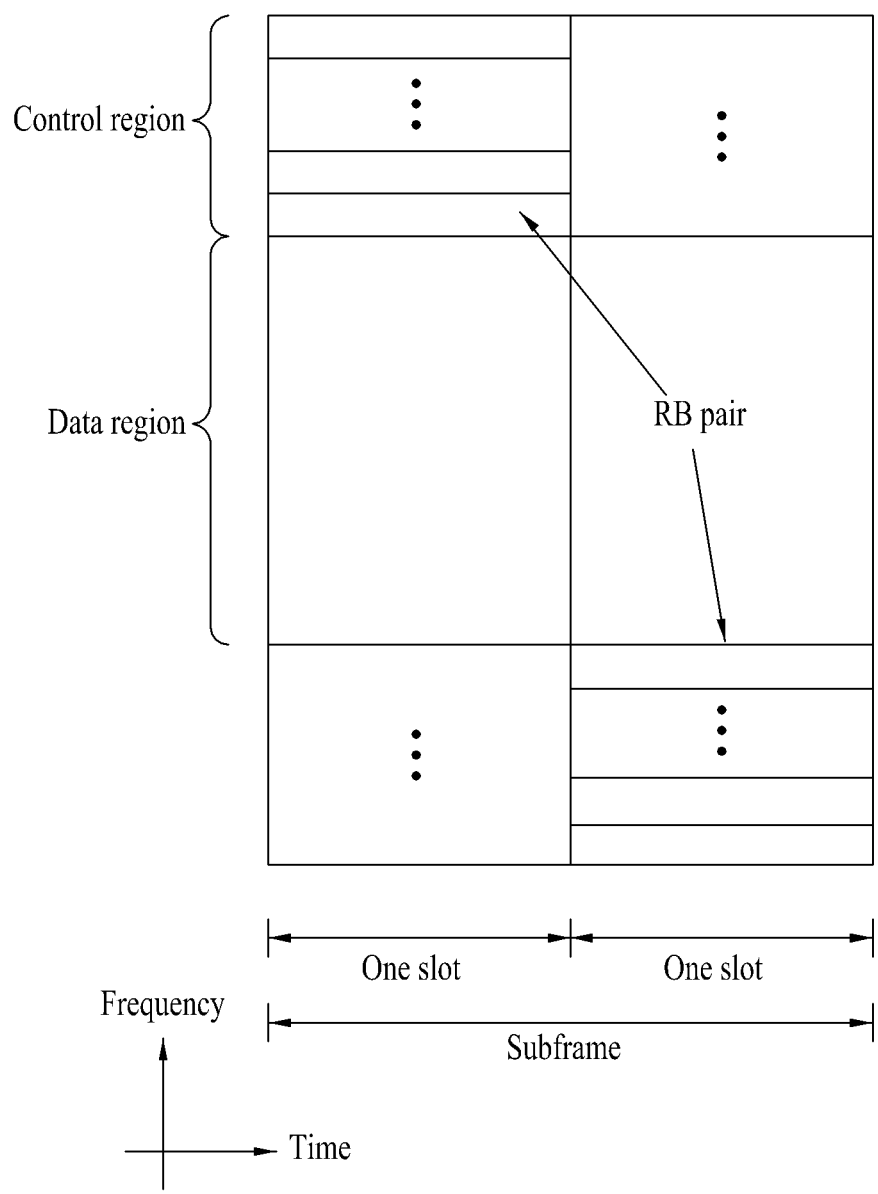
FIG. 4 is a diagram illustrating a structure of an uplink subframe.

FIG. 4 is a diagram illustrating a structure of an uplink subframe. The uplink subframe may be divided into a control region and a data region in a frequency domain. A physical uplink control channel (PUCCH) which includes uplink control information is allocated to the control region. A physical uplink shared channel (PUSCH) which includes user data is allocated to the data region. In order to maintain single carrier properties, one user equipment does not transmit the PUCCH and the PUSCH at the same time. The PUCCH for one user equipment is allocated to a pair of RBs at the subframe. Resource blocks belonging to the pair of RBs occupy different subcarriers for two slots. This will be referred to frequency hopping of a pair of RBs allocated to the PUCCH at the boundary of the slots.

Physical Uplink Control Channel (PUCCH)

The physical uplink control channel (PUCCH) is a channel carrying uplink control information. Various PUCCH formats are defined depending on types of control information included in the PUCCH, modulation mode, the amount of control information, etc. This will hereinafter be described in more detail.

Control signaling information transmitted through the PUCCH may include scheduling request (SR), HARQ ACK/NACK information, and downlink channel measurement information.

The HARQ ACK/NACK information may be generated depending on success of decoding of downlink data packets on the PDSCH. In the existing wireless communication system, 1 bit is transmitted for downlink single codeword transmission as ACK/NACK information, and 2 bits are transmitted for downlink two-codeword transmission as ACK/NACK information.

The channel measurement information refers to feedback information related to a multiple input multiple output (MIMO) scheme, and may include a channel quality indicator (CQI), a precoding matrix index (PMI), and a rank indicator (RI). This channel measurement information may be referred to as CQI. 20 bits per subframe may be used for transmission of CQI.

The PUCCH may be modulated using a binary phase shift keying (BPSK) scheme and a quadrature phase shift keying (QPSK) scheme. Control information of a plurality of user equipments may be transmitted through the PUCCH, and if code division multiplexing (CDM) is performed to identify signals of the respective user equipments, constant amplitude zero autocorrelation (CAZAC) sequences having a length of 12 are mainly used. Since the CAZAC sequences maintain constant amplitude in the time domain and the frequency domain, the CAZAC sequences are suitable to increase coverage by lowering a peak-to-average power ratio (PAPR) or cubic metric (CM) of the user equipment. Also, the ACK/NACK information on transmission of downlink data transmitted through the PUCCH is covered using orthogonal sequence or orthogonal cover (OC).

Also, the control information transmitted onto the PUCCH may be identified using cyclically shifted sequences having different cyclic shift (CS) values. The cyclically shifted sequences may be generated by cyclically shifting basic sequences as much as specific cyclic shift amount. The specific cyclic shift amount is indicated by a cyclic shift index. The number of available cyclic shifts may be varied depending on delay spread of a channel. Various kinds of sequences may be used as the basic sequences. The aforementioned CAZAC sequences are the example of the basic sequences.

Also, the amount of control information that may be transmitted by the user equipment for one subframe may be determined depending on the number of SC-FDMA symbols (that is, SC-FDMA symbols except for SC-FDMA symbols used for reference signal (RS) transmission for coherent detection of the PUCCH) available for transmission of the control information.

In the 3GPP LTE system, the PUCCH is defined by a total of seven different formats depending on the transmitted control information, modulation scheme, the amount of the control information, etc., and attributes of uplink control information (UCI) transmitted depending on each PUCCH format may be summarized as expressed by Table 1 below.

TABLE 1

| PUCCH format | Modulation scheme | Number of bits per subframe | Usage | etc. |
| --- | --- | --- | --- | --- |
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

The PUCCH format 1 is used for independent transmission of SR. In case of SR independent transmission, waveforms which are not modulated are used, and the SR independent transmission will later be described in detail.

The PUCCH format 1a or 1b is used for transmission of HARQ ACK/NACK. If HARQ ACK/NACK is independently transmitted from a random subframe, the PUCCH format 1a or 1b may be used. Alternatively, HARQ ACK/NACK and SR may be transmitted from the same subframe by using the PUCCH format 1a or 1b.

The PUCCH format 2 is used for transmission of CQI, and the PUCCH format 2a or 2b is used for transmission of CQI and HARQ ACK/NACK. In case of the extended CP, the PUCCH format 2 may be used for transmission of CQI and HARQ ACK/NACK.

Figure 5:
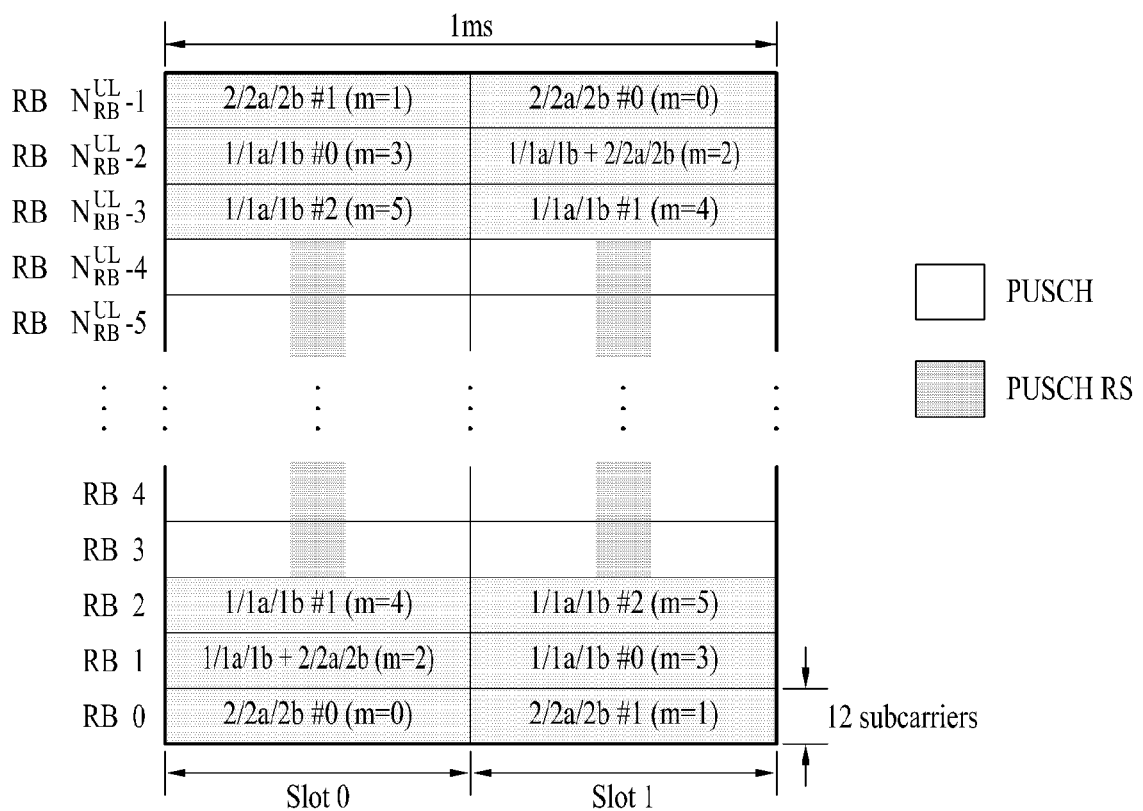
FIG. 5 is a diagram illustrating a mapping rule of PUCCH formats into PUCCH regions in an uplink physical resource block.

FIG. 5 is a diagram illustrating a mapping rule of PUCCH formats into PUCCH regions in an uplink physical resource block. In FIG. 5, $N_{RB}^{UL}$ represents the number of resource blocks on the uplink, and $0, 1, \ldots N_{RB}^{UL}-1$ means numbers of physical resource blocks. Basically, the PUCCH is mapped into both edges of the uplink frequency block. As shown in FIG. 5, the PUCCH formats 2/2a/2b are mapped into the PUCCH region expressed by m=0, 1. This may be expressed that the PUCCH formats 2/2a/2b are mapped into resource blocks located at the band-edge. Also, the PUCCH formats 2/2a/2b and the PUCCH formats 1/1a/1b may together be mapped into the PUCCH region expressed by m=2. Next, the PUCCH formats 1/1a/1b may be mapped into the PUCCH region expressed by m=3, 4, 5. The number $N_{RB}^{(2)}$ of PUCCH RBs that may be used by the PUCCH formats 2/2a/2b may be indicated to the user equipments within the cell by broadcasting signaling.

Hereinafter, the PUCCH formats will be described in detail.

Prior to the description of the PUCCH format 1, the PUCCH formats 1a and 1b will be described.

In the PUCCH formats 1a/1b, symbols modulated using a BPSK or QPSK modulation mode are multiplied by CAZAC sequences of length of 12. After the symbols are multiplied by the CAZAC sequences, they are spread block-wise using orthogonal sequences. Hadamard sequences of a length of 4 are used for normal ACK/NACK information, and discrete fourier transform (DFT) sequences of a length of 3 are used for shortened ACK/NACK information and reference signal. Hadamard sequences of a length of 2 are used for reference signal in case of the extended CP.

Figure 6:
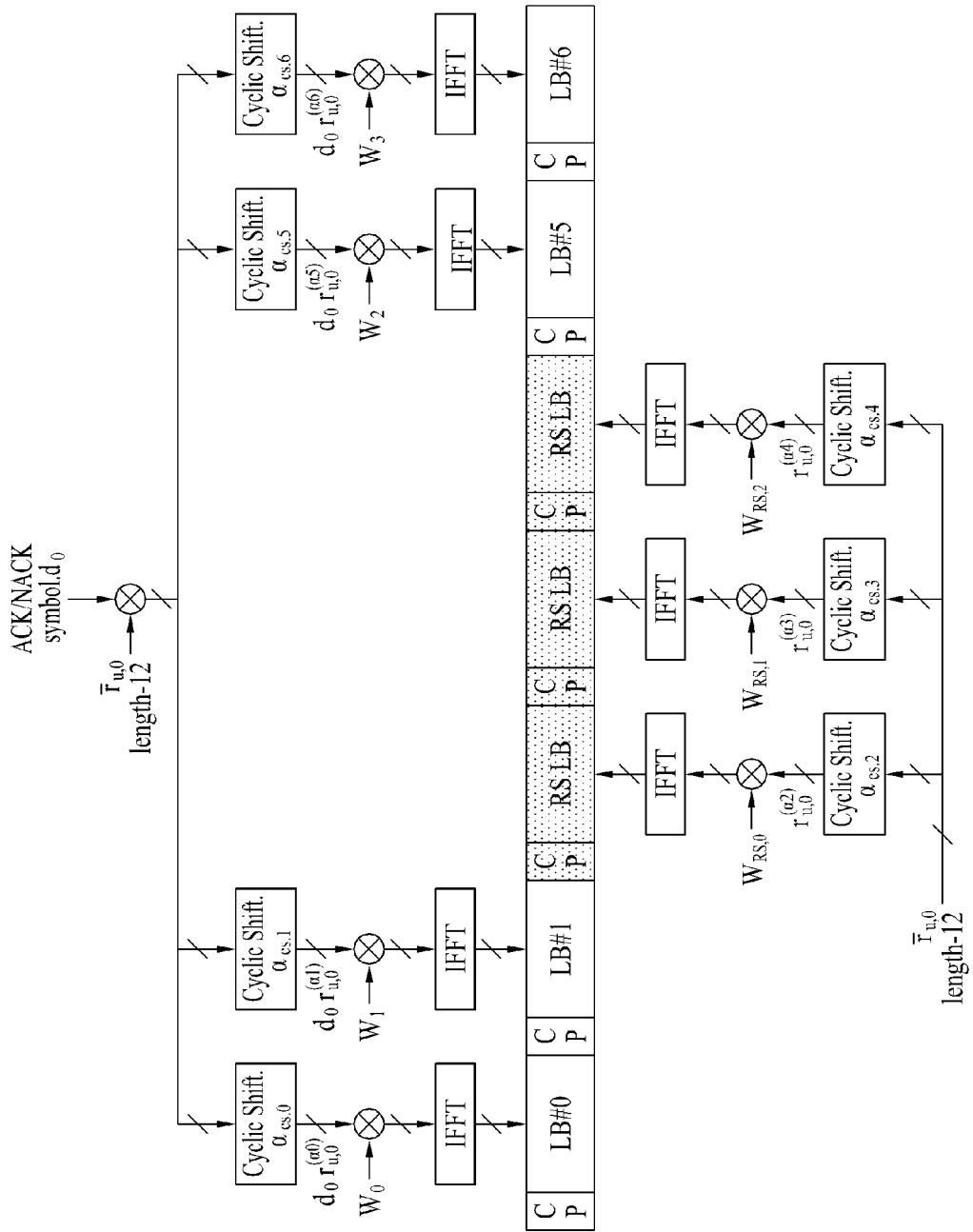
FIG. 6 is a diagram illustrating a structure of ACK/NACK channels in case of normal CP.

FIG. 6 is a diagram illustrating a structure of ACK/NACK channels in case of normal CP. In FIG. 6, a PUCCH channel structure for HARQ ACK/NACK transmission without CQI is exemplarily shown. A reference signal (RS) is carried in three continuous SC-FDMA symbols in the middle of seven SC-FDMA symbols included in one slot, and the ACK/NACK signal is carried in the other four SC-FDMA symbols. In the meantime, in case of the extended CP, the RS may be carried in two continuous middle symbols. The number and location of symbols used for the RS may be varied depending on the control channel, and the number and location of symbols used for the ACK/NACK signal associated with the RS may also be varied depending on the control channel.

Acknowledgement response information (unscrambled status) of 1 bit and 2 bits may be expressed as one HARQ ACK/NACK modulation symbol by using BPSK and QPSK modulation schemes, respectively. ACK may be encoded into '1' while NACK may be encoded into '0'.

When the control signal is transmitted within the allocated band, two-dimensional spread is used to increase multiplexing capacity. In other words, in order to increase the number of user equipments or control channels, which may be multiplexed, frequency domain spread and time domain spread are used at the same time. In order to spread the ACK/NACK signal in the frequency domain, a frequency domain sequence is used as the basic sequence. Zadoff-Chu (ZC) sequence which is one of the CAZAC sequences, may be used as the frequency domain sequence. For example, as different cyclic shifts (CSs) are applied to the ZC sequence which is the basic sequence, the number of CS resources supported by SC-FDMA symbols for the PUCCH RBs for HARQ ACK/NACK transmission is set by a cell-specific upper layer signaling parameter $\Delta_{shift}^{PUCCH}$, and $\Delta_{shift}^{PUCCH} \in \{1, 2, 3\}$ represents 12, 6 or 4 shift.

The ACK/NACK signals spread in the frequency domain are spread in the time domain using orthogonal spreading codes. Walsh-Hadamard sequences or DFT sequences may be used as the orthogonal spreading codes. For example, the ACK/NACK signals may be spread using orthogonal sequences w0, w1, w2, w3 of a length of 4 for four symbols. Also, the RS is spread through the orthogonal sequences of a length of 3 or 2. This will be referred to as orthogonal covering (OC).

A plurality of user equipments may be multiplexed in accordance with a code division multiplex (CDM) mode by using CS resources in the frequency domain and OC resources in the time domain as described above. In other words, ACK/NACK information and RS of a plurality of user equipments may be multiplexed on the same PUCCH RB.

For the aforementioned time domain spreading CDM, the number of spreading codes supported for the ACK/NACK information is limited by the number of RS symbols. In other words, since the number of RS transmission SC-FDMA symbols is smaller than the number of ACK/NACK information transmission SC-FDMA symbols, multiplexing capacity of the RS becomes smaller than that of the ACK/NACK information. For example, in case of the normal CP, ACK/NACK information may be transmitted from four symbols. In this case, three orthogonal spreading codes not four may be used for the ACK/NACK information. This is because that the number of RS transmission symbols is limited to 3 and only three orthogonal spreading codes may be used for the RS.

An example of the orthogonal sequences used for spreading of the ACK/NACK information is as expressed in Table 2 and Table 3. Table 2 illustrates sequences for symbols of a length of 4, and Table 3 illustrates sequences for symbols of a length of 3. The sequences for symbols of a length of 4 are used for the PUCCH formats 1/1a/1b of the normal subframe configuration. In subframe configuration, considering that a sounding reference signal (SRS) is transmitted from the last symbol of the second slot, sequences for symbols of a length of 4 may be applied to the first slot, and shortened PUCCH formats 1/1a/1b for sequences of a length of 3 may be applied to the second slot.

TABLE 2

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

TABLE 3

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

In the meantime, an example of orthogonal sequences used for RS spreading of the ACK/NACK channel is as expressed in Table 4.

TABLE 4

| Sequence index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

If three symbols of one slot are used for RS transmission and four symbols are used for ACK/NACK information transmission at a subframe of the normal CP, for example, if six cyclic shifts are used in the frequency domain and three orthogonal covering (OC) resources are used in the time domain, HARQ responses from a total of eighteen different user equipments may be multiplexed within one PUCCH RB. If two symbols of one slot are used for RS transmission and four symbols are used for ACK/NACK information transmission at a subframe of the extended CP, for example, if six cyclic shifts are used in the frequency domain and two orthogonal covering (OC) resources are used in the time domain, HARQ responses from a total of twelve different user equipments may be multiplexed within one PUCCH RB.

Next, the PUCCH format 1 will be described. The scheduling request (SR) is transmitted in accordance with a scheduling solicited or unsolicited mode of the user equipment. The SR channel reuses ACK/NACK channel structure at the PUCCH formats 1a/1b, and is configured by an on-off keying (OOK) mode on the basis of ACK/NACK channel design. The reference signal is not transmitted to the SR channel. Accordingly, sequences of a length of 7 are used in case of the normal CP, and sequences of a length of 6 are used in case of the extended CP. Different cyclic shifts or orthogonal covering resources may be allocated to the SR and ACK/NACK.

Figure 7:
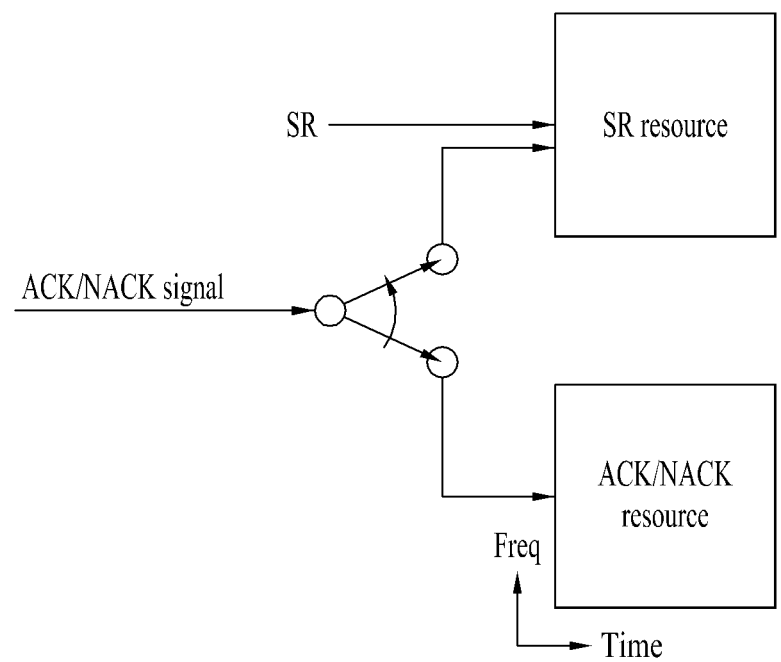
FIG. 7 is a diagram illustrating a case where ACK/NACK information and SR are transmitted at the same time.

The case where the ACK/NACK information and the SR are transmitted at the same time will be described with reference to FIG. 7. As described above, the user equipment may transmit the HARQ ACK/NACK and the SR at the same subframe. For positive SR transmission, the user equipment transmits HARQ ACK/NACK through a resource allocated for SR. For negative SR transmission, the user equipment transmits HARQ ACK/NACK through the resource allocated for ACK/NACK.

Next, the PUCCH formats 2/2a/2b will be described. The PUCCH formats 2/2a/2b are the control channels for transmitting channel measurement feedback (CQI, PMI, RI).

A report period of channel measurement feedback (hereinafter, referred to as CQI information) and frequency unit (or frequency resolution) which is a target for measurement may be controlled by the base station. Periodic and non-periodic CQI report in the time domain may be supported. The PUCCH format 2 is used for periodic report only, and the PUSCH may be used for non-periodic report. In case of non-periodic report, the base station may command the user equipment to transmit resources scheduled for uplink data transmission by carrying individual CQI report in the resources.

Figure 8:
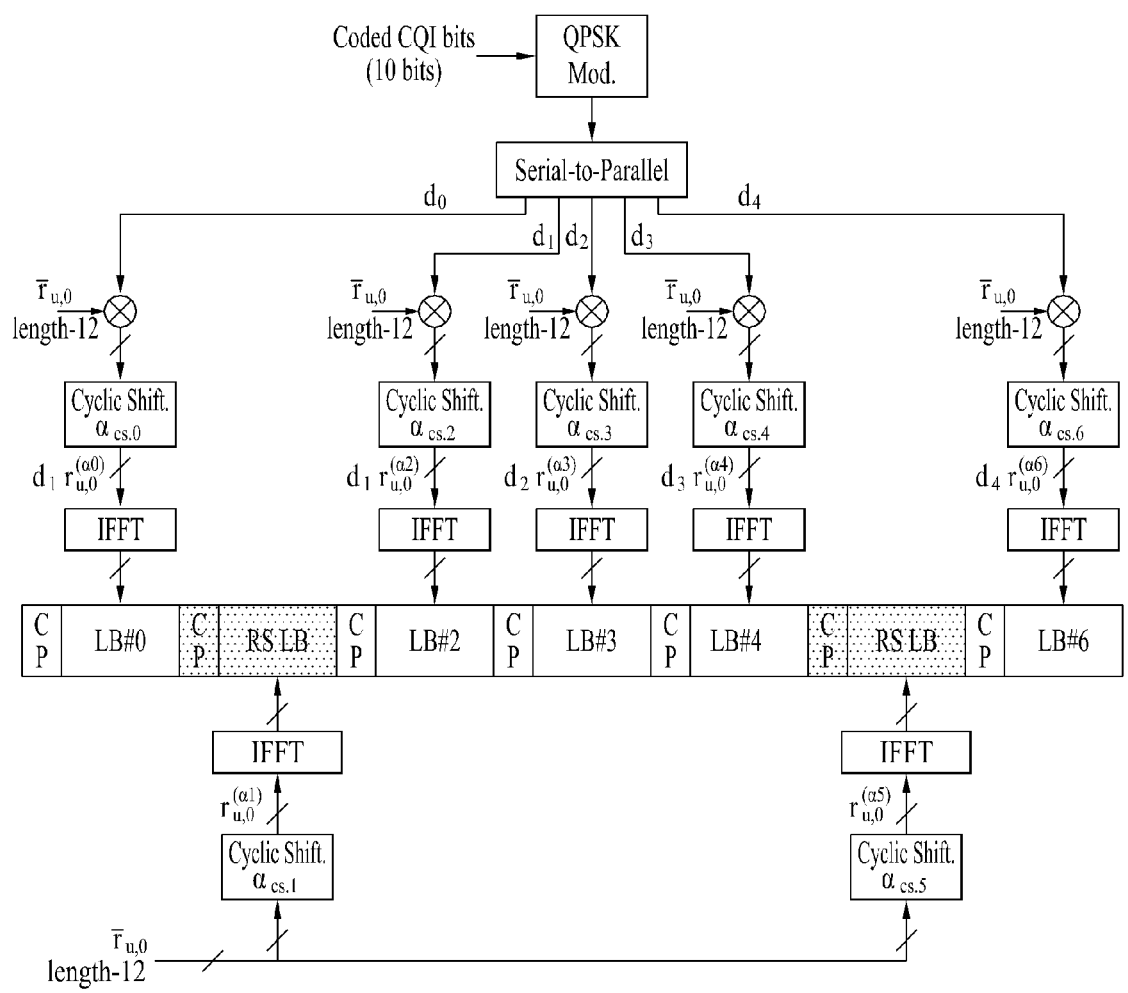
FIG. 8 is a diagram illustrating a structure of a CQI channel in case of normal CP.

FIG. 8 is a diagram illustrating a structure of a CQI channel in case of normal CP. Among SC-FDMA symbols 0 to 6 of one slot, the SC-FDMA symbols 1 and 5 (the second and sixth symbols) are used for demodulation reference signal (DMRS) transmission, and CQI information may be transmitted from the other SC-FDMA symbols. In the meantime, in case of the extended CP, one SC-FDMA symbol (SC-FDMA symbol 3) is used for DMRS transmission.

The PUCCH formats 2/2a/2b support modulation based on the CAZAC sequences, and QPSK modulated symbols are multiplied by CAZAC sequences of a length of 12. Cyclic shifts (CS) of the sequences are varied between the symbol and the slot. Orthogonal covering is used for the DMRS.

The DMRS is carried in two SC-FDMA symbols spaced apart from each other as much as intervals of three SC-FDMA symbols of seven SC-FDMA symbols included in one slot, and CQI information is carried in the other five SC-FDMA symbols. Two RSs are used in one slot to support a high-speed user equipment. Also, the respective user equipment are identified from each other using cyclic shift (CS) sequences. CQI information symbols are modulated and transferred to full SC-FDMA symbols, and the SC-FDMA symbols are configured by one sequence. In other words, the user equipment modulates CQI and transmits the modulated CQI to each sequence.

The number of symbols that may be transmitted for one TTI is 10, and modulation of CQI information is defined by QPSK. If QPSK mapping is used for the SC-FDMA symbols, CQI value of 2 bits may be carried, whereby CQI value of 10 bits may be carried in one slot. Accordingly, CQI value of maximum 20 bits may be carried in one subframe. In order to spread CQI information in the frequency domain, frequency domain spreading codes are used.

CAZAC sequences (for example, ZC sequences) of a length of 12 may be used as the frequency domain spreading codes. Each control channel may be identified using the CAZAC sequences having different cyclic shift values. IFFT is performed for the frequency domain spread CQI information.

12 different user equipments may be orthogonally multiplexed on the same PUCCH RB by cyclic shift having 12 equivalent intervals. In case of the normal CP, DMRS sequences on the SC-FDMA symbols 1 and 5 (on SC-FDMA symbol 3 in case of the extended CP) are similar to CQI signal sequences but are not modulated unlike CQI information. The user equipment may be configured semi-statically by upper layer signaling to periodically report different CQI, PMI and RI types on the PUCCH resource indicated by a PUCCH resource index $n_{PUCCH}^{(2)}$. In this case, the PUCCH resource index is information indicating a PUCCH region used for transmission of the PUCCH formats 2/2a/2b and cyclic shift (CS) value which will be used.

Carrier Aggregation

The introduction of the carrier aggregation technology is considered in the advanced OFDM based mobile communication system. The carrier aggregation technology means the technology that may achieve a high data transmission rate by performing uplink/downlink transmission simultaneously using one or more carriers (component carriers (CC) or cells) designated individually for the downlink or the uplink. The system to which the carrier aggregation technology is applied will be referred to as a multiple carrier system. Hereinafter, an uplink carrier which is a target of carrier aggregation will simply be referred to as UL CC or UL cell, and a downlink carrier will simply be referred to as DL CC or DL cell.

Figure 9:
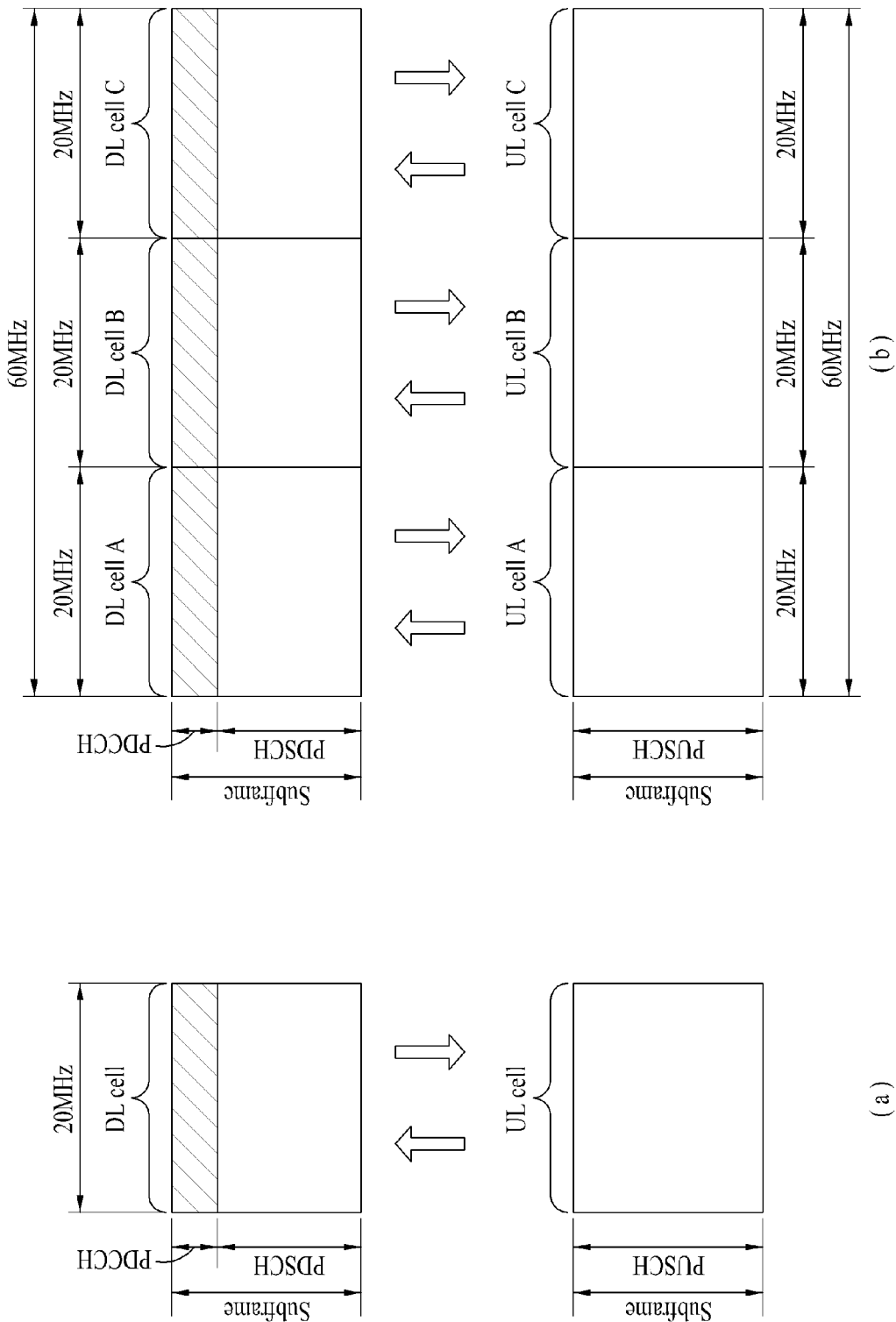
FIG. 9 is a diagram illustrating a single carrier system and a multiple carrier system.

FIG. 9 is a diagram illustrating a single carrier system and a multiple carrier system. FIG. 9(*a*) illustrates downlink/uplink subframe structures in a single carrier system according to the related art. FIG. 9(*b*) illustrates downlink/uplink subframe structures in a multiple carrier system in which three CCs (or cells) are aggregated.

As shown in FIG. 9(*b*), the user equipment may monitor and receive downlink signals/data on a plurality of DL cells at the same time. However, even though the base station manages N number of DL cells, if the network configures M (M≤N) number of DL cells for the user equipment, monitoring of the downlink signals/data of the user equipment may be limited to M number of DL cells. Also, if the network configures L (L≤M≤N) number of DL cells as main DL cells, the user equipment may first monitor and receive the downlink signals/data of the L number of DL cells. These L number of CL cells may be expressed as downlink primary cells (DL P-cell) or downlink (DL) anchor cells, and the DL P-cell may be configured user equipment-specifically or cell-specifically.

Also, cross-carrier scheduling may be applied for the user equipment that may be operate din the system that supports multiple carriers. Cross-carrier scheduling means that scheduling control information of PDSCH transmission on the DL cell B is transmitted through the PDCCH of the DL cell A not the PDCCH of the DL cell B. Alternatively, assuming that linkage of the DL cell A and the UL cell A is configured and linkage of the DL cell A and the UL cell A is configured, it means that scheduling control information of PUSCH transmission on the UL cell B is transmitted through the PDCCH of the DL cell A not the PDCCH of the DL cell B associated with the UL cell B.

In case of this cross-carrier scheduling, application of a carrier indicator field (CIF) may be considered. In the system that supports multiple carriers, the basic principle of PDCCH transmission will be described hereinafter, and the presence of CIF within the PDCCH may be configured by upper layer signaling semi-statically and user equipment-specifically.

First of all, if the CIF is disabled, PDSCH transmission resource allocation information on a DL cell and PUSCH transmission resource allocation information on the UL cell associated with the corresponding DL cell may be provided through the PDCCH on the same DL cell. In this case, CIF is not applied, and the PDCCH structure (coding, CCE-based resource mapping, etc.) and DCI formats defined in the existing 3GPP LTE release-8 system may be used equally.

In the meantime, if the CIF is enabled, PDSCH transmission resource allocation information on the same DL cell and different DL cells and PUSCH transmission resource allocation information on the UL cell associated with the corresponding DL cell and different UL cells may be provided through a PDCCH on a DL cell. DL/UL cells corresponding to the scheduling information may be indicated using the CIF. In this case, DCI format extended from the DCI format defined in the existing 3GPP LTE release-8 system to include CIF may be used. The CIF may be set as a fixed 3-bit field, and the location of the CIF may be fixed regardless of the size of the DCI format. Also, a PDCCH structure (coding, CCE-based resource mapping, etc.) defined in the existing 3GPP LTE release-8 system may be reused.

If the CIF exists, the base station may preferably allocate a DL cell set for monitoring a PDCCH to reduce load of blind decoding in view of the user equipment. Blind decoding means that the base station does not provide the user equipment with information as to where a corresponding PDCCH is located, in the control region allocated within the subframe, and the user equipment monitors a set of PDCCH candidates within the subframe, attempts demasking for CRC of each PDCCH using its C-RNTI, and detects the PDCCHs as its PDCCHs if an error is not detected. Accordingly, if the number of DL cells that should be subjected to blind decoding by the user equipment is too large, load of PDCCH monitoring of the user equipment is increased, whereby the user equipment may configure the DL cell set for PDCCH monitoring. This DL cell set may be configured as a part of the aggregated DL cells, and the user equipment may detect and decode the PDCCH within the configured DL cell set only. In other words, in order to schedule PDSCH/PUSCH transmission to a random user equipment, the base station may transmit PDCCH(s) through a PDCCH monitoring DL cell set only. The PDCCH monitoring DL cell set may be configured user equipment-specifically, user equipment group-specifically or cell-specifically.

Figure 10:
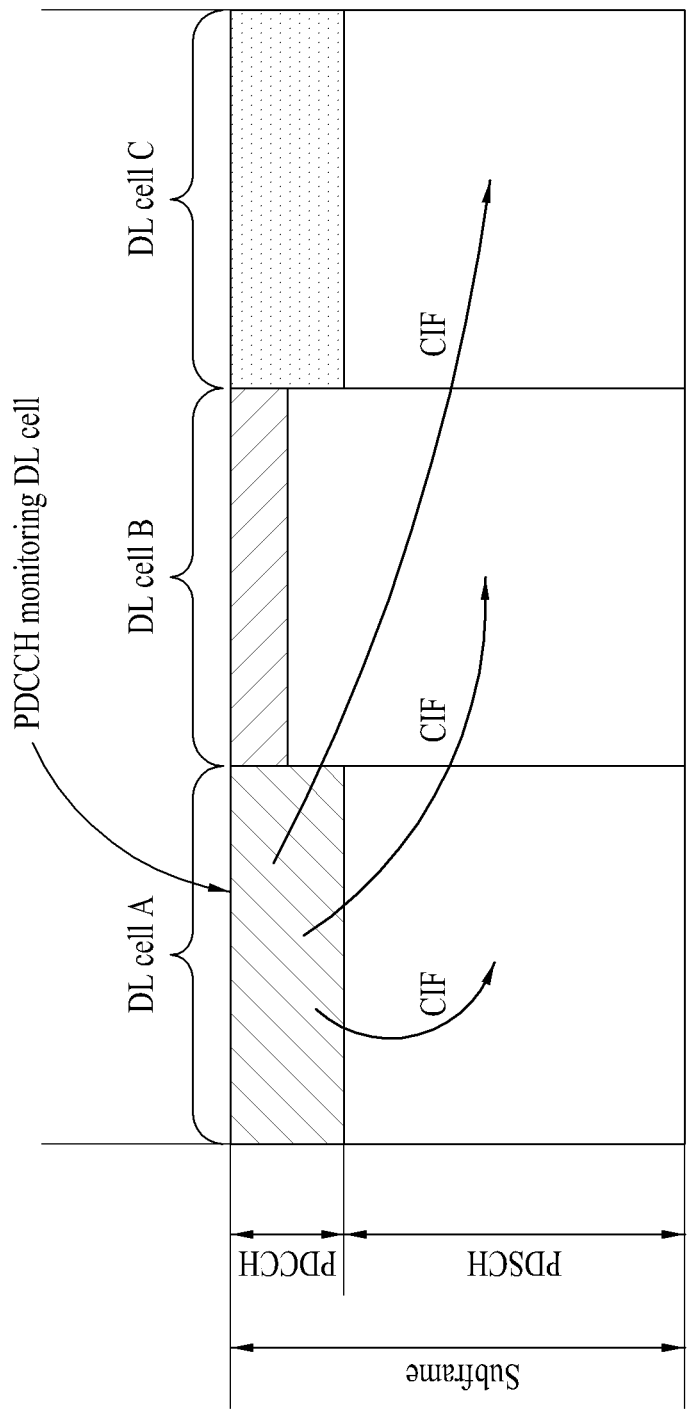
FIG. 10 is a diagram illustrating an example of a multiple carrier system.

FIG. 10 is a diagram illustrating an example of a downlink subframe where three DL cells are aggregated for a user equipment that may be operated in a multiple carrier system. In FIG. 10, a DL cell A is set to a PDCCH monitoring DL cell. If the CIF is disabled, PDSCH scheduling control information on each DL cell may be transmitted through a PDCCH of a corresponding DL cell without CIF. This PDCCH transmission may depend on the PDCCH structure and the DCI format defined in the 3GPP LTE release-8 system. In the meantime, if the CIF is enabled by user equipment-specific upper layer signaling, the PDSCH scheduling control information may be transmitted from the DL cell A only configured as the PDCCH monitoring DL cell set, through the PDCCH. In this case, PDSCH scheduling control information transmitted through the PDCCH on the DL cell A may include scheduling control information on PDSCH transmission on different DL cells (DL cells B and C) as well as PDSCH transmission on the DL cell A by using the CIF. At this time, the PDCCH is not transmitted to the DL cells B and C which are not configured as the PDCCH monitoring DL cell sets.

Next, configuration and activation/deactivation of the DL/UL cells will be described.

As described above, one user equipment may use a plurality of DL/UL cells in the multiple carrier system. These DL/UL cells may be notified to the user equipment by RRC configuration signal, and the user equipment may receive DL data from the plurality of DL/UL cells or transmit UL data to several UL cells. However, if data traffic of the user equipment is not stable and is concentrated on a specific timing, that is, if data traffic of the user equipment is bursty, the user equipment fails to efficiently use DL/UL cells configured by upper layer signaling (RRC configuration). Accordingly, in order to efficiently use the DL/UL cells and prevent unnecessary power consumption from occurring due to buffering, activation/deactivation of dynamic DL/UL cells may be considered. Dynamic activation/deactivation of the DL/UL cells means that configuration of DL/UL cells to be used by the user equipment is updated more frequently (or quickly) than RRC configuration signaling.

In case of the DL cell, an activation/deactivation method per DL cell or a method for simultaneously activating/deactivating all the DL cells except for specific primary DL cell(s) (for example, DL P-cell) may be used as the dynamic activation/deactivation method.

Figure 11:
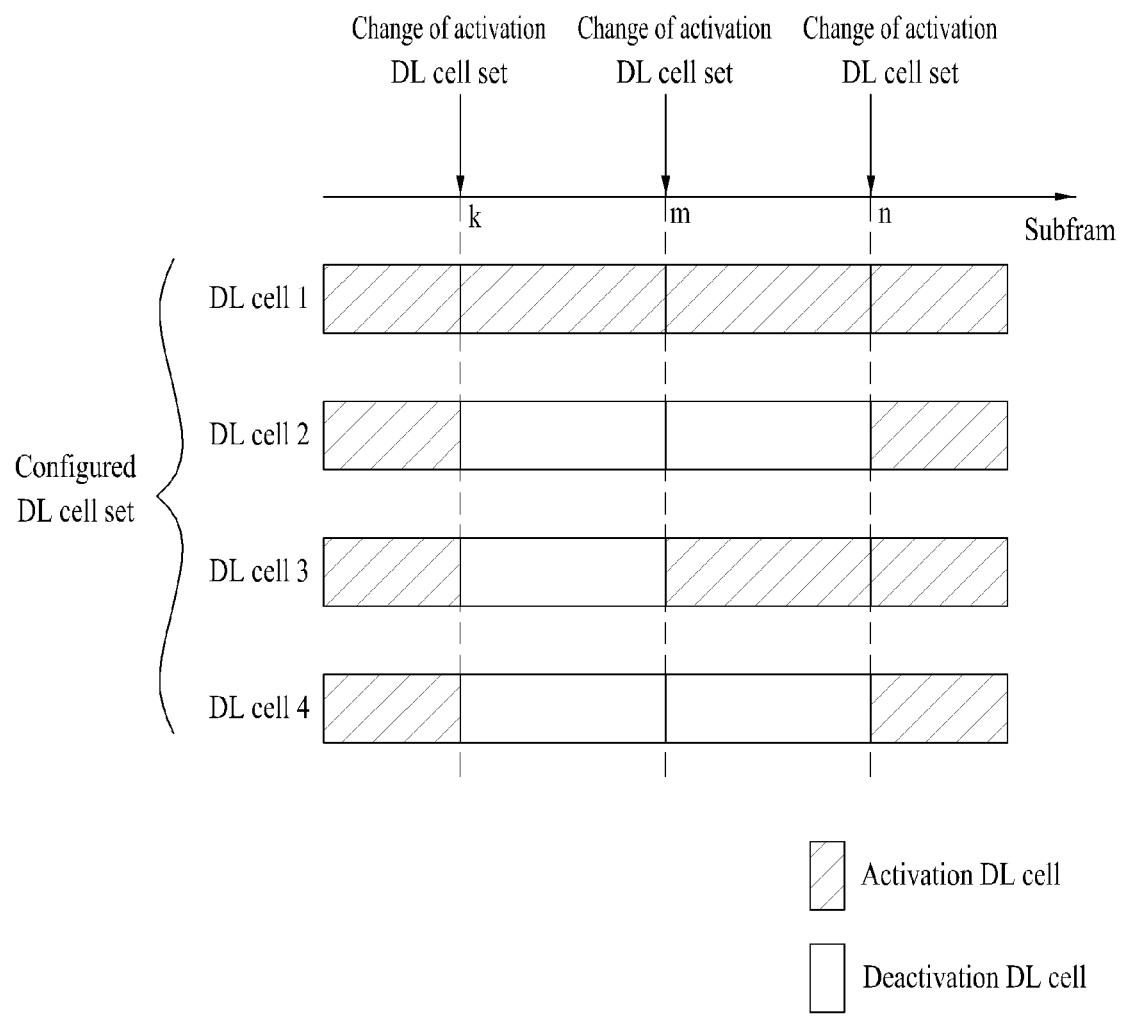
FIG. 11 is a diagram illustrating dynamic activation/deactivation of a downlink carrier.

FIG. 11 is a diagram illustrating dynamic activation/deactivation of a downlink (DL) cell. For example, a total of four DL cells may be configured for a random user equipment as shown in FIG. 11, and the number of DL cells that may be received at a specific timing may be limited or extended using a dynamic activation/deactivation signal. In the example of FIG. 11, DL cells 1 to 4 are all set to an active state prior to subframe k, and only the DL cell 1 may be an active DL cell after the subframe k as the a signal indicating change of an active DL cell set is received at the subframe k. Next, the DL cells 1 and 3 may be active DL cells after the subframe m as a signal indicating change of an active DL cell set is received at the subframe m. Next, the DL cells 1 to 4 may be active DL cells after the subframe n as a signal indicating change of an active DL cell set is received at the subframe n.

Although the DL cell has been exemplarily described with reference to FIG. 11, dynamic activation/deactivation for the UL cell may be performed in the same manner. Also, as dynamic activation/deactivation signals for the DL/UL cells, physical layer control signals through the PDCCH may be used, or MAC layer signals through the PDSCH may be used.

Extended ACK/NACK Resource Allocation

In the system (for example, 3GPP LTE-A system) that supports multiple carriers, the user equipment receives downlink data through a plurality of PDSCHs on a plurality of DL cells, and transmits a plurality of kinds of ACK/NACK information in accordance with the received downlink data. At this time, the plurality of kinds of ACK/NACK information may be transmitted from one or more UL cells at one subframe. Alternatively, it may be configured such that control information such as ACK/NACK information may be transmitted from specific UL cells (for example, UL P-cell) configured as primary UL cells.

Transmission of the plurality of kinds of ACK/NACK information at one subframe by using PUCCH formats 1a/1b requires high transmission power and increases a PAPR of uplink transmission signals, whereby coverage of the user equipment from the base station may be reduced due to inefficient use of a transmission power amplifier. In this case, ACK/NACK bundling or ACK/NACK multiplexing may be considered such that one PUCCH format 1a/1b transmission may be performed. However, if downlink data are received through many DL cells, too many ACK/NACK bits exist, whereby it may be difficult to perform single PUCCH format 1a/1b transmission through direct application of ACK/NACK bundle or multiplexing scheme, or the plurality of kinds of ACK/NACK information may not be transmitted normally.

Also, even though the downlink data are transmitted through DL subframes more than UL subframes in a TDD mode regardless of application of the multiple carrier technology, it may be difficult to perform single PUCCH format 1a/1b transmission through direct application of ACK/NACK bundle or multiplexing scheme, or the plurality of kinds of ACK/NACK information may not be transmitted normally.

Hereinafter, various embodiments of the present invention, which may transmit a plurality of kinds of ACK/ANCK information exactly and efficiently by extending ACK/NACK transmission resources, will be described. First of all, a basic concept of a channel selection scheme that may be applied to ACK/NACK information transmission will be described.

Channel Selection Scheme

If a PUCCH format 1a or 1b is used for uplink ACK/NACK transmission, ACK/NACK information of 1 bit or 2 bits may be transmitted. However, if transmission of a plurality of PDSCHs is performed on one downlink subframe and each ACK/NACK information for transmission of the plurality of PDSCHs should be transmitted at one uplink subframe in the same manner as the multiple carrier system, or in the case that each ACK/NACK information should be transmitted at one uplink subframe for transmission of a plurality of PDSCHs on a plurality of downlink subframes in a TDD mode, a method for expressing ACK/NACK information greater than a size of ACK/NACK information available in the existing PUCCH format 1a/1b will be required.

To express ACK/NACK information greater than maximum 2 bits of the related art, different transmission resources for the PUCCH format 1a/1b may be reserved and channel selection may be applied to the reserved transmission resources, whereby bit size for full ACK/NACK transmission may be increased. For example, a part corresponding to 2 bits may be expressed through the existing PUCCH format 1b, and a part exceeding 2 bits may be expressed through channel selection.

Figure 12:
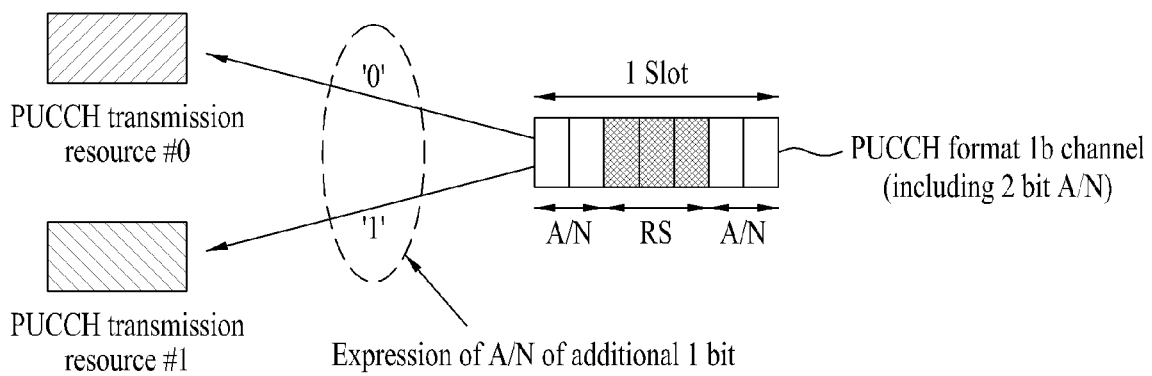
FIG. 12 is a diagram illustrating an example of ACK/NACK channel selection.

FIG. 12 is a diagram illustrating an example of ACK/NACK channel selection. A method for ACK/NACK information of 3 bits using a channel selection scheme will exemplarily be described with reference to FIG. 12. Two different ACK/NACK PUCCH transmission resources may be reserved, and information of 1 bit may be expressed additionally on the basis of a hypothesis as to which resource of the two different ACK/NACK PUCCH transmission resources is selected (that is, channel selection) and transmitted. In more detail, as shown in FIG. 12, two PUCCH format 1 resources (PUCCH transmission resource #0 and #1) for 2 bit ACK/NACK PUCCH format 1b may be configured. If ACK/NACK information of 3 bits is transmitted, 2 bits of ACK/NACK information of 3 bits may be expressed through the PUCCH format 1b, and the other bit may be expressed depending on which resource of the two PUCCH transmission resources is selected. For example, if the PUCCH transmission resource #0 is selected, a hypothesis may be defined that it means '0' and if the PUCCH transmission resource #1 is selected, a hypothesis may be defined that it means '1'. Accordingly, since 1 bit (0 or 1) may be expressed as one of the two PUCCH transmission resources is selected, the ACK/NACK information of additional 1 bit may be expressed together with ACK/NACK information of 2 bits expressed through the PUCCH format 1b.

As described above, if channel selection is applied for transmission of ACK/NACK information, the user equipment may transmit the ACK/NACK information of increased bits while using only transmission energy for transmitting one PUCCH. In the meantime, the base station may attempt detection for all the configured PUCCH transmission resources to detect the PUCCH to which ACK/NACK channel selection is applied.

As described with reference to FIG. 12, for application of the ACK/NACK channel selection scheme, it is required that a plurality of ACK/NACK transmission PUCCH resources should be reserved. In other words, if a plurality of ACK/NACK transmission PUCCH resources are configured, greater ACK/NACK information may be expressed on the basis of a PUCCH resource which is used.

In the present invention, by extending the channel selection scheme, a plurality of PUCCH transmission resources may be allocated to one user equipment, and the corresponding user equipment may appropriately modulate the plurality of PUCCH resources and transmit the modulated PUCCH resources at one uplink subframe, or may select one or a plurality of PUCCH resources of the plurality of PUCCH resources, appropriately modulate the selected PUCCH resource(s) and simultaneously transmit the modulated PUCCH resource(s), whereby ACK/NACK information of increased size may be transmitted. In other words, the existing channel selection scheme is not applied as it is. A channel selection scheme in which one user equipment uses all of a plurality of PUCCH resources, or a channel selection scheme in which some of a plurality of PUCCH resources is selected may be used. For example, one user equipment may transmit ACK/NACK information on the allocated PUCCH resources or transmit ACK/NACK information by selecting some of the plurality of PUCCH resources.

To this end, a detailed method for allocating a plurality of PUCCH resources to one user equipment will be required. Hereinafter, various examples of the present invention, in which a plurality of PUCCH resources are configured, will be described.

As one example, the plurality of PUCCH resources may be used as a type of the PUCCH format 1a/1b defined in the existing 3GPP LTE release-8 system.

Alternatively, a method for increasing multiplexing capacity by appropriately varying a code resource (or sequence resource) of PUCCH ACK/NACK transmission resources may be considered. For example, in an ACK/NACK channel structure in case of the normal CP described with reference to FIG. 6, since identified cyclic shift (CS) values may be applied to sequences of a length-12 in the frequency domain, maximum 12 identified frequency domain code resources exist. Also, in the ACK/NACK channel structure in case of the normal CP described with reference to FIG. 6, since orthogonal spreading codes (OC) of a length-4 are applied to four symbols for ACK/NACK information transmission in the time domain, maximum 4 identified time domain code resources exist. Also, in the ACK/NACK channel structure in case of the normal CP described with reference to FIG. 6, since orthogonal spreading codes (OC) of a length-3 are applied to three symbols for RS transmission in the time domain, maximum 3 identified time domain code resources exist. In the meantime, in case of the extended CP, 12 identified CS resources in the frequency domain, 4 identified OC resources applied to ACK/NACK information transmission symbols in the time domain, and 2 identified OC resources applied to RS transmission symbols in the time domain exist. However, the PUCCH ACK/NACK channel structure based on FIG. 6 is only exemplary, and the scope of the present invention is not limited to such a structure. In other words, although the CS resources of the frequency domain, which may be used as the PUCCH ACK/NACK transmission resources, the OC resources applied to the ACK/NACK information transmission symbols of the time domain, the OC resources applied to the RS transmission symbols of the time domain are used as the principles of the present invention, the principles of the present invention are not limited to the detailed numerical values of the above resources. Accordingly, in various embodiments of the present invention, the plurality of PUCCH ACK/NACK transmission resources (hereinafter, referred to as extended PUCCH ACK/NACK resources) are configured using L number of cyclic shifts (CS) which are code resources applied to the sequences on the frequency domain, M number of identified orthogonal spreading codes (OC) applied to the ACK/NACK information transmission symbols on the time domain, and N number of orthogonal spreading codes (OC) applied to RS transmission symbols on the time domain.

Hereinafter, for clarification in the description of the present invention, a 'data part' in the PUCCH channel structure will refer to as a resource to which uplink control information (for example, ACK/NACK information) is transmitted, and a 'reference signal (RS) part' will refer to as a resource to which a reference signal (RS) is transmitted. In this case, 'data' in the terminology 'data part' is different from user data transmitted through the PUSCH, and means uplink control information transmitted through the PUCCH. Accordingly, in this specification, the PUCCH channel structure will be referred to as the 'data part' and the 'RS part' within the range that there is no confusion. Also, the 'data part' of the uplink control information transmitted through the PUCCH may be referred to as 'information part'.

Also, the OC resources applied to the SC-FDMA symbols for ACK/NACK information transmission in the time domain will be referred to as 'data OC resources' or 'information OC resources', and the OC resources applied to the SC-FDMA symbols for RS transmission in the time domain will be referred to as 'RS OC resources'. Also, the CS resources applied to the sequences of the frequency domain in the data part will be referred to as 'data CS resources' or 'information CS resources', and the CS resources applied to the sequences of the frequency domain in the RS part will be referred to as 'RS CS resources'.

Hereinafter, the PUCCH resources specified by the plurality of CS resources and OC resources will be described. The following description is directed to the number of PUCCH resources that may be configured within one resource block (RB). In this case, a total of L×M number of different combinations may be configured at the data part (or information part) by L number of data CS resources and M number of data OC resources. Each of these combinations will be referred to as 'data resource' or 'information resource'. Similarly, a total of L×N number of different combinations may be configured at the RS part by L number of RS CS resources and N number of RS OC resources. Each of these combinations will be referred to as 'RS resource'. One PUCCH resource may be specified by combination of one data resource (or information resource) and one RS resource.

For example, as shown in FIG. 13, in case of L=12, M=4 and N=3, a total number of identified PUCCH resources that may be allocated to one user equipment in one RB of one subframe will exemplarily be described. In this case, a total of 36 different combinations may be formed at the RS part by using 12 CS resources and 3 OC resources. Also, a total of 48 different combinations may be formed at the data part by using 12 CS resources and 4 OC resources. Also, one PUCCH resource may be specified by one of 36 combinations of the RS part and 48 combinations of the data part. Accordingly, in case of L=12, M=4 and N=3, a total number of identified PUCCH resources that may be allocated in one RB of one subframe is 12×3×12×4=1728 theoretically. If it is limited such that the same CS resource is allocated to the data part and the RS part, for example, a total number of 12×3×4=144 identified PUCCH resources may be configured.

Also, the different PUCCH resources may be identified by different RBs. In other words, as described above, although the different PUCCH resources may be identified using a plurality of different CS resources and OC resources within one RB, even though the same CS resource and OC resource are used, the different PUCCH resources are configured if RBs are different from one another. The different PUCCH resources may be specified even by different RBs and different CS and OC resources. Three different PUCCH resources (first, second and third PUCCH resources) will be described exemplarily. The first PUCCH resource may be specified by data CS1, data OC1, RS CS1 and RS OC1 within RB1, the second PUCCH resource may be specified by data CS2, data OC2, RS CS2 and RS OC2 within RB1, and the third PUCCH resource may be specified by data CS1, data OC1, RS CS1 and RS OC1 within RB2. In other words, if at least one of the RBs, the data CS resources, the data OC resources, the RS CS resources, and the RS OC resources is different from the others, the different PUCCH resources may be specified.

Also, in the present invention, in case of N<M, that is, if the number of available RS OC resources is smaller than that of data OC resources as the length of OC applied to the RS transmission symbols is shorter than that applied to ACK/NACK information transmission symbols, a useful PUCCH resource allocation method will be suggested. In the description of various embodiments of the present invention, it is assumed that a plurality of extended PUCCH ACK/NACK transmission resources allocated to one user equipment belong to the same RB. However, this assumption is for clarification of the description, and allocation of a plurality of PUCCH resources to one user equipment on one or more RBs is not excluded from the scope of the present invention.

Embodiment 1

This embodiment is directed to a method for allocating RS resources smaller than data resources within one RB in allocating a plurality of PUCCH resources to one user equipment. In this case, the 'data resources' are specified by L number CS resources and M number of data OC resources at the data part as described above, and the RS resources are specified by L number of CS resources and N number RS OC resources at the RS part. The following description for this embodiment is directed to different PUCCH resources that may be configured in one RB, among a plurality of PUCCH resources that may be allocated to the user equipment, and a plurality of different PUCCH resources may be allocated to one user equipment on one or more RBs.

For example, in allocating a plurality of PUCCH resources to one user equipment, if K (K≤M) number of data resources are allocated, one or P (P<K) number of RS resources may be allocated.

For example, allocation of one RS resource to one user equipment means that one RS resource which may be used by the corresponding user equipment exists, and thus the corresponding user equipment does not need to consider use of the other RS resources. Accordingly, since the base station which receives ACK/NACK signal from the user equipment knows RS resource used for ACK/NACK signal transmission of the corresponding user equipment, it may estimate a channel using RS transmitted through the corresponding RS resource and acquire extended ACK/NACK information through a plurality of data resources.

Alternatively, if two or more RS resources are allocated to one user equipment, more extended ACK/NACK information may be transmitted using the two or more RS resources than allocation of one RS OC resource.

As described above, in allocating a plurality of PUCCH resources to one user equipment, allocation of data resources more than RS resources is especially useful for the case where a total number of resources that may be allocated as RS resources within one RB is smaller than a total number of resources that may be allocated to the data resources. Accordingly, the RS resources smaller than the number of the data resources are allocated to each user equipment or several user equipments within a random RB, whereby all the data resources within the corresponding RB may be allocated for extended ACK/NACK information transmission without waste.

Also, in the existing 3GPP LTE release-8 system, as described above, despite that the number of OC resources that may be applied to the ACK/NACK data part is theoretically 4 (in case of normal CP), the number of OC resources that may be applied to the ACK/NACK data part is limited to 3 due to the number (three in case of normal CP) of OC resources applied to the RS. However, according to the present invention, even though a total of three (in case of normal CP) OC resources are used at the RS part, a total of four OC resources may be used at the data part without being limited by the number of OC resources available at the RS part.

An example of allocation of a plurality of PUCCH resources to one user equipment will be described with reference to FIG. 14. In FIG. 14, the number of CS resources is L=12 (CS1, CS2, ... , CS12), the number of data OC resources is M=4 (OC1, OC2, OC3, OC4), and the number of RS OC resources is N=3 (OC1, OC2, OC3). In more detail, FIG. 14(a) illustrates that CS resource (CS1) applied to the RS part and three RS resources (OC1, OC2 and OC3) of a total of 36 RS resources specified by combination of RS OC resources are allocated to one user equipment. FIG. 14(b) illustrates that CS resource (CS1) applied to the data part and four RS resources (OC1, OC2, OC3 and OC4) of a total of 48 data resources specified by combination of data OC resources are allocated to one user equipment. In this case, since the PUCCH resource allocated by combination of three RS resources and four data resources are specified, it may be expressed that 12 PUCCH resources may be allocated to one user equipment.

In the existing 3GPP LTE release-8 system, one RS OC resource and one data OC resource are allocated to one user equipment at one subframe. In the meantime, according to the present invention, as shown in FIG. 14, one user equipment may be allocated with one CS resource and four OC resources at the data part, and may be allocated with one CS resource and three OC resources at the RS part. Alternatively, one user equipment may be allocated with one CS resource and one or more of four data OC resources at the data part. Also, one user equipment may be allocated with one CS resource and one or more of three RS OC resources at the RS part.

Figures 15, 16:
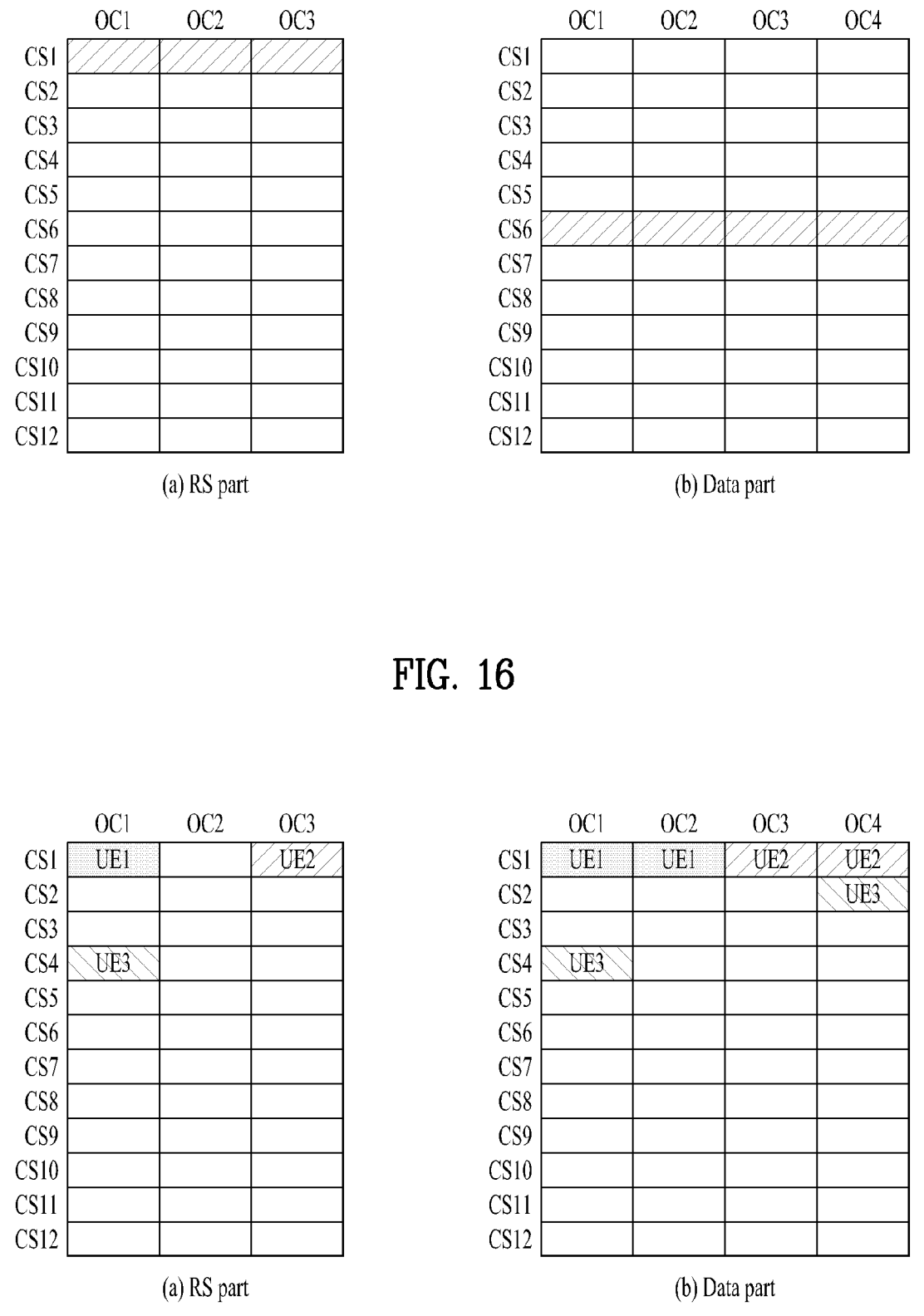

Also, in the example of FIG. 14, the CS resource allocated to one user equipment at the data part is the same as that allocated to one user equipment at the RS part. However, the present invention is not limited to the example of FIG. 14. As shown in FIG. 15, CS resource CS6 allocated to one user equipment at the data part may be different from CS resource CS1 allocated to one user equipment at the RS part.

In the meantime, as shown in FIG. 16, one RS resource and two data resources may be allocated to one user equipment. In this case, since the PUCCH resources allocated by combination of one RS resource and two data resources are specified, it may be expressed that a total of two PUCCH resources may be allocated to one user equipment. In the example of FIG. 16, the same CS resource CS1 may be allocated to the first user equipment UE1 and the second user equipment UE2 at the data part, and two different data OC resources may be allocated to each of the UE1 and the UE2 (that is, OC1 and OC2 may be allocated to the UE1, and OC3 and OC4 may be allocated to the UE2). Also, FIG. 16 illustrates that the same CS resource CS1 is allocated to the UE1 and the UE2 at the RS part and different RS OC resources are respectively allocated to the UE1 and the UE2 (that is, OC1 is allocated to the UE1 and OC3 is allocated to the UE2). Accordingly, even though the number of OC resources available at the RS part is smaller than the number of OC resources available at the data part, all the OC resources of the data part may be used.

Also, according to the example of the present invention, different CS resources may be allocated to one user equipment. For example, like the example of PUCCH resource allocation to the third user equipment UE3 of FIG. 16, a plurality of different CS resources CS3 and CS4 and a plurality of different OC resources OC1 and OC4 may be allocated to one user equipment at the data part, whereby two data resources may be allocated to one user equipment.

In this case, in allocating a plurality of PUCCH resources to each of a plurality of user equipments of one subframe, the resources may be configured such that any one of RS resource and data resource from one RB allocated to one user equipment may not be allocated to the other user equipments. For example, if CS1 and OC1 (RS resource 1) are allocated to the UE1 at the RS part of RB1, and CS1 and OC1 (data resource 1) and CS1 and OC2 (data resource 2) are allocated to the UE1 at the data part, it is assumed that the RS resource 1 (RS resource allocated to the UE1) is allocated to the UE2 from the same RB1 and at the same time CS1 and OC3 (data resource 3) and CS1 and OC4 (data resource 4) are allocated to the UE2 at the data part. In this case, it may be regarded that different PUCCH resources are allocated to the UE1 and the UE2, a problem may occur in that the base station, which receives ACK/NACK signals from several user equipments, may not identify a user equipment of RS transmitted on RS resource 1 of RB1.

In the meantime, another example of allocation of four data resources and three RS resources (one or more of three RS resources) to one user equipment will be described with reference to FIG. 17. FIG. 17 illustrates an example of allocation of different CS resources to one user equipment. As shown in FIG. 17, three RS resources of CS1 and OC1, CS2 and OC2, and CS1 and OC3 may be allocated to one user equipment at the RS part, and four data resources of CS1 and OC1, CS2 and OC2, CS1 and OC3 and CS2 and OC4 may be allocated to one user equipment at the data part. In particular, in the present invention, different CS resources for neighboring OC resources may be allocated, whereby interference between the resources may be avoided. However, in the present invention, regardless of the fact that OC resources are adjacent to the CS resources, allocation of different CS resources for different OC resources is not excluded.

One user equipment may appropriately modulate the plurality of PUCCH resources allocated from one RB and simultaneously transmit the modulated PUCCH resources at one uplink subframe in accordance with the aforementioned various embodiments of the present invention, or may select one or more of a plurality of PUCCH resources, appropriately modulate the selected PUCCH resource(s) and simultaneously transmit the modulated PUCCH resource(s), whereby ACK/NACK information of increased size may be transmitted.

Embodiment 2

This embodiment is directed to a method for allocating the same OC resource and different CS resources to one or both of data resources and RS resources within one RB in allocating a plurality of PUCCH resources to one user equipment. In this case, as described above, the 'data resources' are specified by L number CS resources and M number of data OC resources at the data part, and the 'RS resources' are specified by L number of CS resources and N number RS OC resources at the RS part. The following description for this embodiment is directed to different PUCCH resources that may be configured in one RB, among a plurality of PUCCH resources that may be allocated to the user equipment, and a plurality of different PUCCH resources may be allocated to one user equipment on one or more RBs.

In allocating a plurality of PUCCH resources to each of a plurality of user equipments at one subframe, so that each user equipment may transmit ACK/NACK information, in view of the base station, which receives ACK/NACK information, time/frequency synchronization of a plurality of PUCCH resources allocated to one user equipment has relatively high accuracy, whereas time/frequency synchronization of a plurality of PUCCH resources allocated to different user equipments may have relatively low accuracy. Accordingly, in identifying the plurality of PUCCH resources allocated to one user equipment, even though OC resources applied to the time domain are allocated equally, CS resources of the frequency domain may be allocated differently, whereby the plurality of PUCCH resources may sufficiently be identified from one another. On the other hand, since the difference in uplink timing between different user equipments may occur even though uplink timing alignment is considered, in order to identify the plurality of PUCCH resources allocated to different user equipments, it may not be sufficient that different resources are allocated on the frequency domain without identification on the time domain. Accordingly, in order to identify the plurality of PUCCH resources allocated to different user equipments, it may be preferable that different OC resources are allocated to each user equipment on the time domain.

FIG. 18 illustrates an example of allocation the same OC resource and different CS resources to one user equipment. As shown in FIG. 18, one OC resource OC1 and a plurality of CS resources CS1, CS2, CS3 and CS4 may be allocated to one user equipment at the RS part, whereby a plurality of RS resources may be allocated. Also, one OC resource OC1 and a plurality of CS resources CS1, CS2, CS3 and CS4 may be allocated to one user equipment at the data part, whereby a plurality of RS resources may be allocated.

Although FIG. 18 illustrates an example of allocation of neighboring CS resources to one user equipment, the CS resources allocated to one user equipment may not be adjacent to one another. For example, as shown in FIG. 19, one OC resource and CS1, CS3 and CS6 may be allocated at the RS part and one OC resource and CS1, CS3, CS5 and CS7 may be allocated at the data part.

Figures 19, 20:
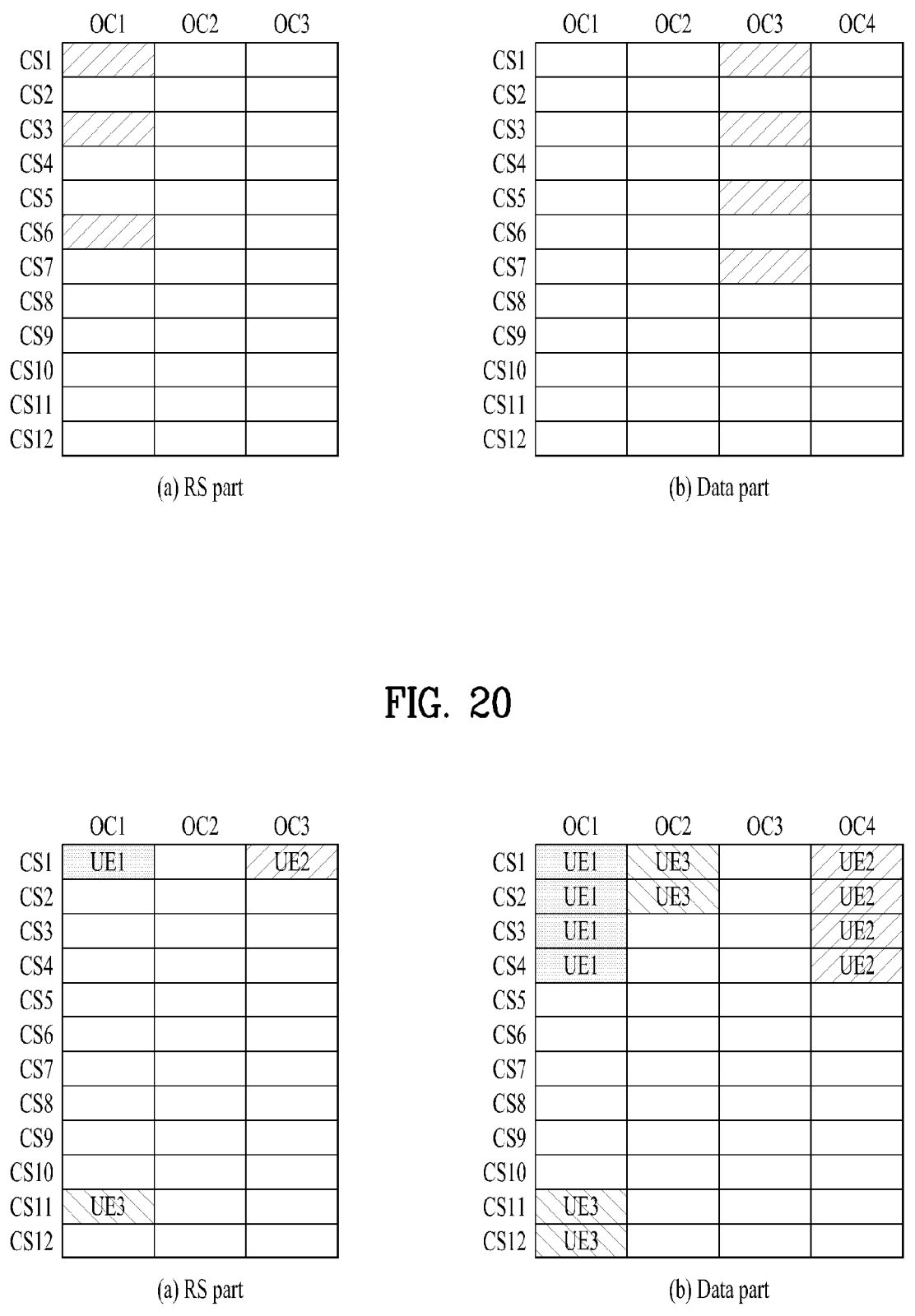

Also, although the same OC resource OC1 may be allocated to one user equipment at the RS part and the data part as shown in FIG. 18, the OC resource OC1 allocated to one user equipment at the RS part may be different from the OC resource OC3 allocated to one user equipment at the data part as shown in FIG. 19.

According to this embodiment 2, the RS resources smaller than the data resources may be allocated to the user equipment as described in the aforementioned embodiment 1. For example, one OC resource OC3 and four CS resources CS1, CS3, CS5 and CS7 may be allocated at the data part, and one OC resource OC1 and three CS resources CS1, CS3 and CS6 may be allocated at the RS part. Also, only one RS resource (for example, OC1 and CS1) may be allocated at the RS part.

An example of allocation of a plurality of PUCCH resources to each of a plurality of user equipments will be described with reference to FIG. 20. In FIG. 20, one RS resource and four data resources are allocated to one user equipment. In the example of FIG. 20, although different CS resources based on the same OC resource are allocated to each of the first user equipment UE1 and the second user equipment UE2 at the data part, different CS resources based on different OC resources may be allocated one user equipment such as the third user equipment UE3.

For example, when the data resources are allocated to each user equipment, an allocation rule of a plurality of data resources may be assumed in such a manner that CS resources are first filled on one OC resource and then next OC resource is filled. According to this allocation rule, if CS1 to CS10 of OC1 are allocated to different user equipments like the case of UE3 in FIG. 20, in order to allocate four data resources to the UE3, after two data resources of OC1 and CS11, and OC1 and CS12 are allocated, since there is no CS resource, which is to be allocated, in OC1, OC2 and CS1, and OC2 and CS2 may be allocated.

One user equipment may appropriately modulate the plurality of the allocated PUCCH resources and simultaneously transmit the modulated PUCCH resources at one uplink subframe in accordance with the aforementioned various embodiments of the present invention, or may select one or more of a plurality of PUCCH resources, appropriately modulate the selected PUCCH resource(s) and simultaneously transmit the modulated PUCCH resource(s), whereby ACK/NACK information of increased size may be transmitted.

Embodiment 3

This embodiment is directed to a method for allocating additional control information (for example, scheduling request (SR)) together with ACK/NACK information depending on which RS resource of a plurality of RS resources allocated to each user equipment is used to transmit RS (that is, channel selection scheme for RS resources) in allocating a plurality of PUCCH resources to one user equipment. In this case, the 'RS resources' are specified by combination of RS CS resources, RS OC resources and resource block (RB). In other words, if one or more of the RS CS resources, the RS OC resources and RB are different from each other, the RS resources correspond to different RS resources.

A detailed example of a method for transmitting additional uplink control information by using RS resources will be described. For example, it is assumed that two RS resources are allocated to one user equipment when PUCCH resources for ACK/NACK transmission are allocated thereto. Since this embodiment relates to a method for transmitting additional information through RS resources, it is assumed that a random number of data resources (or information resources) are allocated to the corresponding user equipment (for example, data resources more than those in the aforementioned embodiments 1 and 2 may be allocated). In this case, a state of the additional control information may be expressed depending on which RS resource of a plurality of RS resources allocated to one user equipment is used. For example, if the additional control information is SR information, SR information may have one of two states (that is, SR On and SR Off). In this case, if the plurality of RS resource are allocated to one user equipment, one state (for example, SR Off) of SR information is expressed when the first RS resource is used, and the other state (for example, SR On) of the SR information may be expressed if the second RS resource is used. In other words, if the user equipment transmits the RS using the first RS resource of the two RS resources, it is defined that the user equipment does not perform scheduling request (that is, SR Off). If the user equipment transmits the RS using the second RS resource, it is defined that the user equipment performs scheduling request (that is, SR On). And, the SR information may be transmitted depending on which RS resource of the first and second RS resources is used to transmit the RS.

Although SR information is exemplarily used as the additional uplink control information transmitted together with ACK/NACK information in the following description, the scope of the present invention is not limited to the following description. In other words, all kind of control information, which may be expressed by on off keying (OOK) mode or a predetermined size (for example, 1 bit size), may be used as the additional control information.

Also, when the plurality of RS resources are allocated to one user equipment, the same OC resource and different CS resources may be allocated from the same RB. Since there is no difference in time/frequency synchronization between the plurality of RS resources used by one user equipment, the RS resources may be identified as different RS resources even though only CS resources are different. However, since time/frequency synchronization between RS resources used by different user equipments is not relatively exact, it is difficult to identify the RS resources used by each user equipment by using CS resources only. Accordingly, it is preferable that the plurality of RS resources allocated to one user equipment are identified by using different CS resources, and the RS resources allocated to different user equipments are identified by different RBs or different OC resources. However, the scope of the present invention is not limited to the above example, and one or more of RS CS resources, RS OC resources and RBs may differently be allocated to one user equipment when a plurality of RS resources are allocated to one user equipment. For example, the same CS resource and different OC resources from the same RB may be allocated to one user equipment, and different OC resources and different CS resources from the same RB may be allocated. Alternatively, if RS resources from each of different RBs are allocated to one user equipment, since RBs are different even though the same OC resource and the same CS resource are allocated, identified RS resources may be allocated.

In transmitting additional control information (for example, SR) together with ACK/NACK information, the channel selection scheme may be used. In this case, the ACK/NACK information may be mapped/transmitted as one of a plurality of data resources is selected, and the additional control information (for example, SR) may be mapped/selected as one of a plurality of RS resources is selected. Basically, although transmission of the ACK/NACK information is performed through PUCCH resources (combination of data resources and RS resources), in the existing ACK/NACK transmission system, the RS resources are only those to which a reference signal (RS) for channel estimation is transmitted, and could not represent the state of the additional control information. The additional control information may be transmitted depending on which RS resource is used in accordance with the method suggested in the present invention. Hereinafter, detailed examples of this embodiment will be described.

The following Table 5 illustrates transmission of additional control information (for example, SR) in accordance with a channel selection scheme for RS resources together with transmission of ACK/NACK information of 2 bit size in accordance with the channel selection scheme.

TABLE 5

|  | Ch1 | | Ch2 | |
| --- | --- | --- | --- | --- |
|  | RS | Data | RS | Data |
| Off, N, N | 1 | 1 | 0 | 0 |
| Off, A, N | 1 | −1 | 0 | 0 |
| Off, N, A | 1 | 0 | 0 | 1 |
| Off, A, A | 1 | 0 | 0 | −1 |
| On, N, N | 0 | 1 | 1 | 0 |
| On, A, N | 0 | −1 | 1 | 0 |
| On, N, A | 0 | 0 | 1 | 1 |
| On, A, A | 0 | 0 | 1 | −1 |

In the above Table 5, Ch1 and Ch2 represent the first PUCCH resource and the second PUCCH resource, respectively. One PUCCH resource may be configured by combination of one data resource and one RS resource. In the Ch1, RS represents the first RS resource, and Data represents the first data resource. In other words, the first PUCCH resource may be specified by combination of the first data resource and the first RS resource. Likewise, in the Ch2, RS represents the second RS resource, and Data represents the second data resource.

In the above Table 5, Off represents SR Off (that is, negative SR), and On represents SR On (that is, positive SR). In the above Table 5, N means NACK and A means ACK. In more detail, N,N represents that HARQ responses for two downlink data are all NACK, A,N represents that the HARQ responses are ACK and NACK, N,A represents that the HARQ responses are NACK and ACK, and A,A represents that the HARQ responses are ACK and ACK. Numbers 1, −1 in the above Table 5 represent values for modulating corresponding resources (that is, BPSK). In other words, in order to express ACK/NACK information of 2 bits, information of 1 bit may be expressed by BPSK modulation, and information of the other 1 bit may be expressed by selection of one of two channels. In the above Table 5, 0 represents that the corresponding resource is not used.

First of all, transmission of ACK/NACK information of 2 bits in accordance with a channel selection scheme of data resources will be described. As shown in the above Table 5, N,N and A,N may be represented by modulation of the first data resource (Data of Ch1) into 1 and −1. As shown in the above Table 5, N,A and A,A may be represented by modulation of the second data resource (Data of Ch2) into 1 and −1. If the existing ACK/NACK information is transmitted in accordance with the channel selection scheme, the RS is transmitted through a predetermined RS resource. Although separate information as to which RS resource is used is not expressed, according to the present invention, additional information may be expressed depending on which RS resource is used.

If additional information (for example, SR) is transmitted together with the ACK/NACK information transmitted as above, the channel selection scheme of the RS resources may be used. In more detail, as shown in the above Table 5, SR Off may be represented by RS transmission based on the first RS resource (RS of Ch1), and SR On may be represented by RS transmission based on the second RS resource (RS of Ch2).

On the contrary to the example of the above Table 5, a mapping relation between RS resources and additional information (SR) may be configured. For example, SR On may be expressed by RS transmission based on the first RS resource (RS of Ch1), and SR Off may be expressed by RS transmission based on the second RS resource (RS of Ch2). Similarly, a mapping relation between ACK/NACK information of 2 bits and data resources may be configured on the contrary to the example of the above Table 5. For example, N,A and A,A may be represented by modulation of the first data resource (Data of Ch1) into 1 and −1. Also, N,N and A,N may be represented by modulation of the second data resource (Data of Ch2) into 1 and −1.

In the meantime, the following Table 6 illustrates another example of transmission of additional control information (for example, SR) in accordance with a channel selection scheme for RS resources together with transmission of ACK/NACK information of 2 bit size in accordance with the channel selection scheme.

TABLE 6

|  | Ch1 | | Ch2 | |
| --- | --- | --- | --- | --- |
|  | RS | Data | RS | Data |
| Off, N, N | 1 | 1 | 0 | 0 |
| Off, A, N | 1 | −1 | 0 | 0 |
| Off, N, A | 0 | 0 | 1 | 1 |
| Off, A, A | 0 | 0 | 1 | −1 |
| On, N, N | 0 | 1 | 1 | 0 |
| On, A, N | 0 | −1 | 1 | 0 |
| On, N, A | 1 | 0 | 0 | 1 |
| On, A, A | 1 | 0 | 0 | −1 |

Ch1, Ch2, RS, Data, Off, On, N, A, 1, −1, and 0 in the above Table 6 mean those in the Table 5. In the example of the above Table 6 unlike the example of the Table 5, SR Off or SR On may be expressed depending on whether the same RS resource as the data resource used for ACK/NACK information transmission is used.

In more detail, SR Off may be mapped that the same resource as the data resource used for ACK/NACK information transmission is used. In other words, if the first (or second) data resource is used for ACK/NACK information transmission, SR Off may be expressed by use of the first (or second) RS resource. SR On may be mapped that a resource different from the data resource used for ACK/NACK information transmission is used. In other words, if the first (or second) data resource is used for ACK/NACK information transmission, SR On may be expressed by use of the second (or first) RS resource.

On the contrary to the example of the above Table 6, mapping of RS resource indicating SR On/Off may be configured. For example, SR Off may be mapped that a resource different from the data resource used for ACK/NACK information transmission is used. In other words, if the first (or second) data resource is used for ACK/NACK information transmission, SR Off may be expressed by use of the second (or first) RS resource. SR On may be mapped that the same resource as the data resource used for ACK/NACK information transmission is used. In other words, if the first (or second) data resource is used for ACK/NACK information transmission, SR On may be expressed by use of the first (or second) RS resource.

In the meantime, the following Table 7 illustrates an example of transmission of additional control information (for example, SR) in accordance with a channel selection scheme for RS resources together with transmission of ACK/NACK information of 3 bit size in accordance with the channel selection scheme.

TABLE 7

|  | Ch1 | | Ch2 | |
| --- | --- | --- | --- | --- |
|  | RS | Data | RS | Data |
| On, N, N, N | 1 | 1 | 0 | 0 |
| On, N, N, A | 1 | −j | 0 | 0 |
| On, N, A, N | 1 | j | 0 | 0 |
| On, N, A, A | 1 | −1 | 0 | 0 |
| On, A, N, N | 1 | 0 | 0 | 1 |
| On, A, N, A | 1 | 0 | 0 | −j |
| On, A, A, N | 1 | 0 | 0 | j |
| On, A, A, A | 1 | 0 | 0 | −1 |
| Off, N, N, N | 0 | 1 | 1 | 0 |
| Off, N, N, A | 0 | −j | 1 | 0 |
| Off, N, A, N | 0 | j | 1 | 0 |
| Off, N, A, A | 0 | −1 | 1 | 0 |
| Off, A, N, N | 0 | 0 | 1 | 1 |
| Off, A, N, A | 0 | 0 | 1 | −j |
| Off, A, A, N | 0 | 0 | 1 | j |
| Off, A, A, A | 0 | 0 | 1 | −1 |

Ch1, Ch2, RS, Data, Off, On, N, A, and 0 in the above Table 7 mean those in the Table 5. In the above Table 7, 1, −1, j, and −j represent values for modulating corresponding resources (that is, QPSK). In other words, in order to express ACK/NACK information of 3 bits, information of 2 bits may be expressed by QPSK modulation, and information of the other 1 bit may be expressed by selection of one of two channels.

First of all, transmission of ACK/NACK information of 3 bits in accordance with a channel selection scheme of data resources will be described. As shown in the above Table 7, N,N,N and N,N,A, and N,A,N and N,A,A may respectively be represented by modulation of the first data resource (Data of Ch1) into 1, −j, j and −1. Also, as shown in the above Table 7, A,N,N and A,N,A, and A,A,N and A,A,A may respectively be represented by modulation of the second data resource (Data of Ch2) into 1, −j, j and −1. If the existing ACK/NACK information is transmitted in accordance with the channel selection scheme, the RS is transmitted through a predetermined RS resource. Although separate information as to which RS resource is used is not expressed, according to the present invention, additional information may be expressed depending on which RS resource is used.

If additional information (for example, SR) is transmitted together with the ACK/NACK information transmitted as above, the channel selection scheme of the RS resources may be used. In more detail, as shown in the above Table 7, SR Off may be represented by RS transmission based on the first RS resource (RS of Ch1), and SR On may be represented by RS transmission based on the second RS resource (RS of Ch2).

On the contrary to the example of the above Table 7, a mapping relation between RS resources and additional information (SR) may be configured. For example, SR On may be expressed by RS transmission based on the first RS resource (RS of Ch1), and SR Off may be expressed by RS transmission based on the second RS resource (RS of Ch2). Similarly, a mapping relation between ACK/NACK information of 3 bits and data resources may be configured on the contrary to the example of the above Table 7. For example, N,N,N and N,N,A, and N,A,N and N,A,A may respectively be represented by modulation of the second data resource (Data of Ch2) into 1, −j, j and −1. Also, A,N,N and A,N,A, and A,A,N and A,A,A may respectively be represented by modulation of the first data resource (Data of Ch1) into 1, −j, j and −1.

In the meantime, the following Table 8 illustrates another example of transmission of additional control information (for example, SR) in accordance with a channel selection scheme for RS resources together with transmission of ACK/NACK information of 3 bit size in accordance with the channel selection scheme.

TABLE 8

|  | Ch1 | | Ch2 | |
| --- | --- | --- | --- | --- |
|  | RS | Data | RS | Data |
| Off, N, N, N | 1 | 1 | 0 | 0 |
| Off, N, N, A | 1 | −j | 0 | 0 |
| Off, N, A, N | 1 | j | 0 | 0 |
| Off, N, A, A | 1 | −1 | 0 | 0 |
| Off, A, N, N | 0 | 0 | 1 | 1 |
| Off, A, N, A | 0 | 0 | 1 | −j |
| Off, A, A, N | 0 | 0 | 1 | j |
| Off, A, A, A | 0 | 0 | 1 | −1 |
| On, N, N, N | 0 | 1 | 1 | 0 |
| On, N, N, A | 0 | −j | 1 | 0 |
| On, N, A, N | 0 | j | 1 | 0 |
| On, N, A, A | 0 | −1 | 1 | 0 |
| On, A, N, N | 1 | 0 | 0 | 1 |
| On, A, N, A | 1 | 0 | 0 | −j |
| On, A, A, N | 1 | 0 | 0 | j |
| On, A, A, A | 1 | 0 | 0 | −1 |

Ch1, Ch2, RS, Data, Off, On, N, A, 1, −1, and 0 in the above Table 8 mean those in the Table 7. In the example of the above Table 8 unlike the example of the Table 7, SR Off or SR On may be expressed depending on whether the same RS resource as the data resource used for ACK/NACK information transmission is used.

In more detail, SR Off may be mapped that the same resource as the data resource used for ACK/NACK information transmission is used. In other words, if the first (or second) data resource is used for ACK/NACK information transmission, SR Off may be expressed by use of the first (or second) RS resource. SR On may be mapped that a resource different from the data resource used for ACK/NACK information transmission is used. In other words, if the first (or second) data resource is used for ACK/NACK information transmission, SR On may be expressed by use of the second (or first) RS resource.

On the contrary to the example of the above Table 8, mapping of RS resource indicating SR On/Off may be configured. For example, SR Off may be mapped that a resource different from the data resource used for ACK/NACK information transmission is used. In other words, if the first (or second) data resource is used for ACK/NACK information transmission, SR Off may be expressed by use of the second (or first) RS resource. SR On may be mapped that the same resource as the data resource used for ACK/NACK information transmission is used. In other words, if the first (or second) data resource is used for ACK/NACK information transmission, SR On may be expressed by use of the first (or second) RS resource.

In the meantime, the following Table 9 illustrates an example of transmission of additional control information (for example, SR) in accordance with a channel selection scheme for RS resources together with transmission of ACK/NACK information of 4 bit size in accordance with the channel selection scheme.

TABLE 9

|  | Ch1 | | Ch2 | | Ch3 | | Ch4 | |
|---|---|---|---|---|---|---|---|---|
|  | RS | Data | RS | Data | RS | Data | RS | Data |
| Off, N, N, N, N | 1 | 1 | 0 | 0 | 0 | 0 | 0 | 0 |
| Off, N, N, N, A | 1 | −j | 0 | 0 | 0 | 0 | 0 | 0 |
| Off, N, N, A, N | 1 | j | 0 | 0 | 0 | 0 | 0 | 0 |
| Off, N, N, A, A | 1 | −1 | 0 | 0 | 0 | 0 | 0 | 0 |
| Off, N, A, N, N | 0 | 0 | 1 | 1 | 0 | 0 | 0 | 0 |
| Off, N, A, N, A | 0 | 0 | 1 | −j | 0 | 0 | 0 | 0 |
| Off, N, A, A, N | 0 | 0 | 1 | j | 0 | 0 | 0 | 0 |
| Off, N, A, A, A | 0 | 0 | 1 | −1 | 0 | 0 | 0 | 0 |
| Off, A, N, N, N | 0 | 0 | 0 | 0 | 1 | 1 | 0 | 0 |
| Off, A, N, N, A | 0 | 0 | 0 | 0 | 1 | −j | 0 | 0 |
| Off, A, N, A, N | 0 | 0 | 0 | 0 | 1 | j | 0 | 0 |
| Off, A, N, A, A | 0 | 0 | 0 | 0 | 1 | −1 | 0 | 0 |
| Off, A, A, N, N | 0 | 0 | 0 | 0 | 0 | 0 | 1 | 1 |
| Off, A, A, N, A | 0 | 0 | 0 | 0 | 0 | 0 | 1 | −j |
| Off, A, A, A, N | 0 | 0 | 0 | 0 | 0 | 0 | 1 | j |
| Off, A, A, A, A | 0 | 0 | 0 | 0 | 0 | 0 | 1 | −1 |
| On, N, N, N, N | 0 | 1 | 0 | 0 | 1 | 0 | 0 | 0 |
| On, N, N, N, A | 0 | −j | 0 | 0 | 1 | 0 | 0 | 0 |
| On, N, N, A, N | 0 | j | 0 | 0 | 1 | 0 | 0 | 0 |
| On, N, N, A, A | 0 | −1 | 0 | 0 | 1 | 0 | 0 | 0 |
| On, N, A, N, N | 0 | 0 | 0 | 1 | 0 | 0 | 1 | 0 |
| On, N, A, N, A | 0 | 0 | 0 | −j | 0 | 0 | 1 | 0 |
| On, N, A, A, N | 0 | 0 | 0 | j | 0 | 0 | 1 | 0 |
| On, N, A, A, A | 0 | 0 | 0 | −1 | 0 | 0 | 1 | 0 |
| On, A, N, N, N | 1 | 0 | 0 | 0 | 0 | 1 | 0 | 0 |
| On, A, N, N, A | 1 | 0 | 0 | 0 | 0 | −j | 0 | 0 |
| On, A, N, A, N | 1 | 0 | 0 | 0 | 0 | j | 0 | 0 |
| On, A, N, A, A | 1 | 0 | 0 | 0 | 0 | −1 | 0 | 0 |
| On, A, A, N, N | 0 | 0 | 1 | 0 | 0 | 0 | 0 | 1 |
| On, A, A, N, A | 0 | 0 | 1 | 0 | 0 | 0 | 0 | −j |
| On, A, A, A, N | 0 | 0 | 1 | 0 | 0 | 0 | 0 | j |
| On, A, A, A, A | 0 | 0 | 1 | 0 | 0 | 0 | 0 | −1 |

In the above Table 9, Ch1, Ch2, Ch3 and Ch4 represent the first PUCCH resource, the second PUCCH resource, the third PUCCH resource, and the fourth PUCCH resource, respectively. One PUCCH resource may be configured by combination of one data resource and one RS resource. In the Ch1, RS represents the first RS resource, and Data represents the first data resource. In other words, the first PUCCH resource may be specified by combination of the first data resource and the first RS resource. Likewise, in the Ch2, RS represents the second RS resource, and Data represents the second data resource. In the Ch3, RS represents the third RS resource, and Data represents the third data resource. In the Ch4, RS represents the fourth RS resource, and Data represents the fourth data resource. In the above Table 9, Off, On, N, A, 1, j, −j, −1 and 0 mean those in the Table 7. In order to express ACK/NACK information of 4 bits, information of 2 bits may be expressed by QPSK modulation, and information of the other 2 bits may be expressed by selection of one of four channels.

First of all, transmission of ACK/NACK information of 4 bits in accordance with a channel selection scheme of data resources will be described. As shown in the above Table 9, N,N,N,N and N,N,N,A, and N,N,A,N and N,N,A,A may respectively be represented by modulation of the first data resource (Data of Ch1) into 1, −j, j and −1. Also, N,A,N,N and N,A,N,A, and N,A,A,N and N,A,A,A may respectively be represented by modulation of the second data resource (Data of Ch2) into 1, −j, j and −1. Also, A,N,N,N and A,N,N,A, and A,N,A,N and A,N,A,A may respectively be represented by modulation of the third data resource (Data of Ch3) into 1, −j, j and −1. Also, A,A,N,N and A,A,N,A, and A,A,A,N and A,A,A,A may respectively be represented by modulation of the fourth data resource (Data of Ch4) into 1, −j, j and −1. If the existing ACK/NACK information is transmitted in accordance with the channel selection scheme, the RS is transmitted through a predetermined RS resource. Although separate information as to which RS resource is used is not expressed, according to the present invention, additional information may be expressed depending on which RS resource is used.

In the example of the above Table 9, SR Off or SR On may be expressed depending on whether the same RS resource as the data resource used for ACK/NACK information transmission is used. For example, as shown in the above Table 9, RS resource the same as the data resource may be used in case of SR Off, and RS resource different from the data resource may be used in case of SR On.

In case of SR On, a random RS resource may basically be selected from three RS resources except for one RS resource the same as the data resource, among four different RS resources. In this case, SR On may be configured in such a manner that RS resource having a maximum distance from the data resource is used. For example, RS resource having a maximum difference in the CS amount (or CS index) from the data resource used for ACK/NACK information transmission, RS resource having a maximum difference in index of CS/OC combination from the data resource used for ACK/NACK information transmission, or RS resource having a maximum RB distance (distance in the frequency domain or difference in RB index) from the data resource used for ACK/NACK information transmission may be used. In the example of the above Table 9, to express SR On, RS resource having a distance of 2 from the data resource used for ACK/NACK information transmission is used. In this way, if the RS having a maximum distance from the data resource is used, confusion at a receiving side (for example, base station) for neighboring data resources may be reduced.

Alternatively, on the contrary to the example of the above Table 9, mapping of RS resource indicating SR On/Off may be configured. In other words, RS resource different from the data resource may be used in case of SR Off, and RS resource the same as the data resource may be used in case of SR On.

In accordance with the aforementioned various examples of the present invention, one user equipment may transmit various kinds of control information (ACK/NACK information and additional control information) by being allocated with a plurality of PUCCH resources at one uplink subframe.

Embodiment 4

The aforementioned embodiment 3 has described the method for transmitting additional control information (for example, SR control information) in accordance with a channel selection scheme of RS resource on the basis of allocation of a plurality of RS resources to each user equipment. In this case, if the plurality of RS resources are allocated to each user equipment mutual-exclusively, it is not efficient in view of acquisition of RS resources. In this embodiment, a method for increasing efficiency in use of RS resources by sharing the same RS resource(s) among a plurality of user equipments to transmit additional control information will be described.

For example, different user equipments may be allocated with PUCCH resources (combination of data resource and RS resource) to transmit ACK/NACK information and SR information together. At this time, if SR information is not transmitted, respective RS resource may be allocated to each user equipment as the RS resource used for transmission of ACK/NACK information only. In the meantime, if the SR information (SR On or SR Off) is transmitted, the same RS resource may be allocated to each user equipment as the RS resource used for simultaneous transmission of the ACK/NACK information and the SR information.

In this case, since the SR information is the control information requested from the user equipment to the base station to allocate uplink resources if there exist uplink data to be transmitted from the user equipment, SR is not transmitted frequently. Accordingly, even though a plurality of user equipments share the RS resource for SR transmission, since the possibility of collision among the user equipment is low, the RS resource may be used efficiently.

Additionally, user equipments which share the RS resource may configure a transmission timing of SR information differently. In other words, SR transmission from each of a plurality of user equipments which share the RS resource may be multiplexed in accordance with a time division multiplexing (TDM) mode. In this case, since different user equipments may be prevented from using the same RS resource at the same time, the RS resource may be used more efficiently.

If a plurality of user equipments are configured to share the RS resource(s), for efficient RS resource use, the RS resource may be allocated to each user equipment as follows.

For example, one RS resource may be allocated to be shared by maximum two user equipments. In this case, collision in use of the RS resource among the user equipments may be minimized and at the same time efficiency in use of the RS resource may be increased.

Also, user equipments, which use a non-shared RS resource (that is, RS resource having different OCs) of a specific OC to transmit ACK/NACK information only in a random RB, may be allocated with one or more of RS resources of the same OC to share the RS resource(s), thereby transmitting ACK/NACK information and SR information at the same time. Alternatively, user equipments which use a non-shared RS resource (that is, RS resource having different CSs) of a specific CS for ACK/NACK transmission only in a random RB, may be allocated with one or more of predetermined RS resources of the same CS to transmit ACK/NACK information and SR information at the same time. For example, in PUCCH resources (combination of data resource and RS resource) allocated for ACK/NACK transmission to each of the first user equipment and the second user equipment in one RB, different RS resources (different OC resources and/or CS resources for RS part) may be allocated to each user equipment. In this case, in the same manner as the aforementioned embodiment 3, as RS resource used by each user equipment to transmit ACK/NACK information and SR information at the same time, one RS resource (or additional RS resource) specified as the same CS resource and the same OC resource may equally be allocated to the first user equipment and the second user equipment in one RB.

As described above, if the scheme for sharing RS resource among a plurality of user equipment to transmit ACK/NACK information and additional control information is used, the RS resource shared by the plurality of user equipments is not designated previously, and the base station may flexibly select whether to allocate the RS resource to be shared by the user equipments or not to be shared by the user equipments. In this case, the PUCCH resources (data resource and RS resource) for ACK/NACK information transmission may be allocated as follows.

For example, the base station may independently allocate data resource(s) and RS resource(s) to each user equipment. In this case, the data resources may independently be allocated to one user equipment by the base station, or if one of the data resources is allocated, the other data resources may be determined in accordance with a rule which is previously defined on the basis of the allocated one data resource. Likewise, the RS resources may independently be allocated to one user equipment by the base station, or if one of the RS resources is allocated, the other RS resources may be determined in accordance with a rule which is previously defined on the basis of the allocated one RS resource.

For another example, the base station may allocate the data resource(s) to each user equipment, and the RS resource(s) to be used by the corresponding user equipment may be determined in accordance with a rule which is previously defined on the basis of the allocated data resource(s). In this case, the shared RS resource that may be used by the user equipments to transmit the ACK/NACK information and additional control information together may separately be allocated from the base station to each user equipment.

Allocation of the data resources and the RS resources based on the aforementioned various methods may be configured to each user equipment through upper layer signaling (for example, RRC signaling) from the base station.

Also, if the shared RS resource that may be used by each of the plurality of user equipments to transmit the ACK/NACK information and additional control information together is allocated in accordance with the aforementioned various examples of the present invention, the PUCCH resources (data resource and RS resource) allocated to one user equipment may be allocated within the same RB that includes the allocated shared RS resource. Alternatively, the PUCCH resources (data resource and RS resource) allocated to one user equipment may be allocated within the RB, which includes the allocated shared RS resource, and its contiguous RB.

The methods for allocating shared RS resource as suggested in the aforementioned various examples of the present invention may be allocated a random method for transmitting uplink control information through PUCCH resources. For example, if the ACK/NACK information is transmitted in accordance with ACK/NACK channel selection scheme, the aforementioned shared RS resource may be allocated for transmission of the additional control information. Alternatively, if uplink control information is transmitted using a plurality of PUCCH resources, the aforementioned shared RS resource may be allocated for transmission of the additional control information. For another example, if one user equipment transmits various kinds of uplink control information by using a plurality of PUCCH resources, some or all of the plurality of PUCCH resources allocated to one user equipment may be allocated in accordance with the aforementioned method for allocation of the shared RS resource. Alternatively, some or all of the plurality of PUCCH resources allocated to one user equipment to implement the ACK/NACK channel selection scheme may be allocated in accordance with the aforementioned method for allocation of the shared RS resource.

Figure 21:
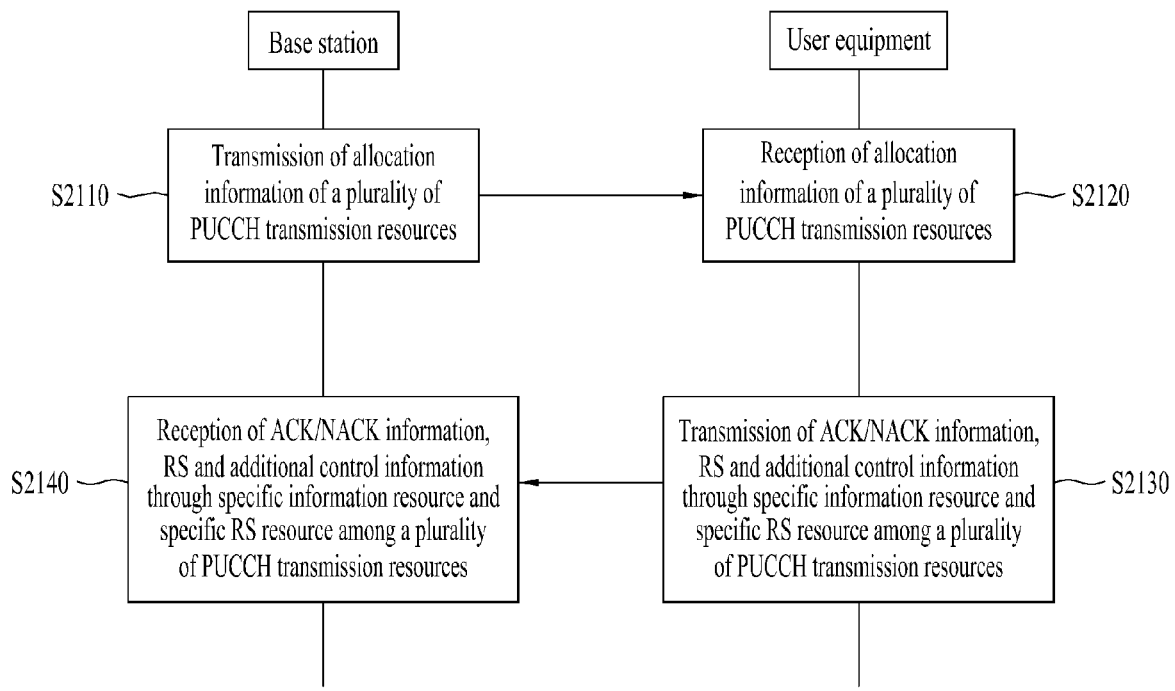
FIG. 21 is a flow chart illustrating a method for transmitting extended uplink control information in accordance with one embodiment of the present invention.

FIG. 21 is a flow chart illustrating a method for transmitting extended uplink control information in accordance with one embodiment of the present invention.

At step S2110, the base station may allocate a plurality of physical uplink control channel (PUCCH) transmission resources to one user equipment and transmit information on the allocation to the user equipment. Each of the plurality of PUCCH transmission resources may be configured by combination information resource (or data resource) and reference signal (RS) resource. In this case, the information resource (data resource) means the resource into which uplink control information is mapped, and the RS resource means the resource into which RS transmitted together with the uplink control information is mapped. When the base station allocates the plurality of PUCCH resources to the user equipment, it may allocate a plurality of RS resources to one user equipment. In this case, different RS resources of the plurality of RS resources may be identified from one another in such a manner that at least one of a location of a resource block (RB) to which the RS is transmitted, a cyclic shift (CS) value applied to the RS in the frequency domain and orthogonal spreading code (OC) applied to the RS in the time domain is configured differently. For example, if a plurality of RS resources are allocated to one user equipment, the same RB and the same OC value may be given for the plurality of RS resources and different CS values may be given for each of the plurality of RS resources.

At step S2120, the user equipment may receive allocation information on the plurality of PUCCH transmission resources allocated from the base station to the corresponding user equipment.

At step S2130, the user equipment may transmit the uplink control information through the allocated PUCCH resources. In more detail, the user equipment may transmit additional control information together with uplink ACK/NACK information through specific information resource (or data resource) and specific RS resource of the allocated PUCCH resources.

In the method for transmitting and receiving uplink control information in accordance with the example of the present invention, the additional control information may be expressed on the basis of selection of RS resource to which the RS is transmitted together with the uplink control information. For example, if the user equipment intends to transmit ACK/NACK information, it transmits the reference signal RS through a specific RS resource while transmitting message (that is, ACK or NACK for each of one or more downlink codewords) of the ACK/NACK information through the specific data resource (or information resource). At this time, the additional control information may be expressed depending on what specific RS resource used by the user equipment for RS transmission is. In other words, at the step S2120, the state of the additional control information may be indicated depending on which one of a plurality of RS resources allocated to the user equipment is used by the user equipment to transmit the RS.

For example, if the specific RS resource used for transmission of the RS transmitted from the user equipment together with the ACK/NACK information is the first RS resource of the plurality of RS resources allocated to the user equipment, the first state of the additional control information may be indicated. If the specific RS resource is the second RS resource, the second state of the additional control information may be indicated. For example, if the additional control information is scheduling request (SR), the user equipment may transmit the RS by using the first RS resource when transmitting the ACK/NACK information to express the first state (scheduling request unsolicited from the user equipment) of the SR information. Likewise, the user equipment may transmit the RS by using the second RS resource when transmitting the ACK/NACK information to express the second state (scheduling request solicited from the user equipment) of the SR information.

Alternatively, if the PUCCH transmission resource to which the specific RS resource used for transmission of the RS transmitted from the user equipment together with the ACK/NACK information belongs is different the PUCCH transmission resource to which the specific information resource used for transmission of the ACK/NACK information by the user equipment belongs, the first state of the additional control information may be indicated. If the former PUCCH transmission resource is the same as the latter PUCCH transmission resource, the second state of the additional control information may be indicated.

At step S2140, the base station may receive the ACK/NACK information, the RS information and the additional control information, which are transmitted from the user equipment, through the specific information resource and the specific RS resource of the plurality of PUCCH resources allocated to the user equipment. The base station may identify the state of the additional control information transmitted from the user equipment, on the basis of selection of the RS resource used for RS transmission, among the plurality of RS resources allocated to the user equipment. In other words, the base station may identify the additional control information depending on which one of the plurality of RS resources is used to allow the base station to receive the RS.

As described above, if the additional control information is transmitted on the basis of the RS resource selected for transmission of the RS transmitted together with the uplink control information, among the plurality of RS resources, various examples described in the aforementioned embodiment 3 may be applied to the method of FIG. 21.

Also, in allocating a plurality of PUCCH transmission resources to one user equipment to transmit uplink control information, the same RS resource as a plurality of RS resources allocated to one user equipment may be allocated to the other user equipments. In other words, the plurality of RS resources may be shared among the plurality of user equipments, and the various examples described in the aforementioned embodiment 4 may be applied to this sharing.

The matters described in the aforementioned various embodiments of the present invention may independently be applied to the method for transmitting extend uplink control information according to the present invention described in FIG. 21, or two or more embodiments may be applied to the method of FIG. 21. The repeated description will be omitted for clarification.

Also, in the various embodiments of the present invention, although the base station has been described as an example of the downlink transmitting entity and the user equipment has been described as an example of the uplink transmitting entity, the scope of the present invention is not limited to the above example. In other words, even in the case that a relay station is used as the downlink transmitting entity to the user equipment or the uplink receiving entity from the user equipment, or used as the uplink transmitting entity to the base station or the downlink receiving entity from the base station, the principle of the present invention described through the various embodiments of the present invention may equally be used.

Figure 22:
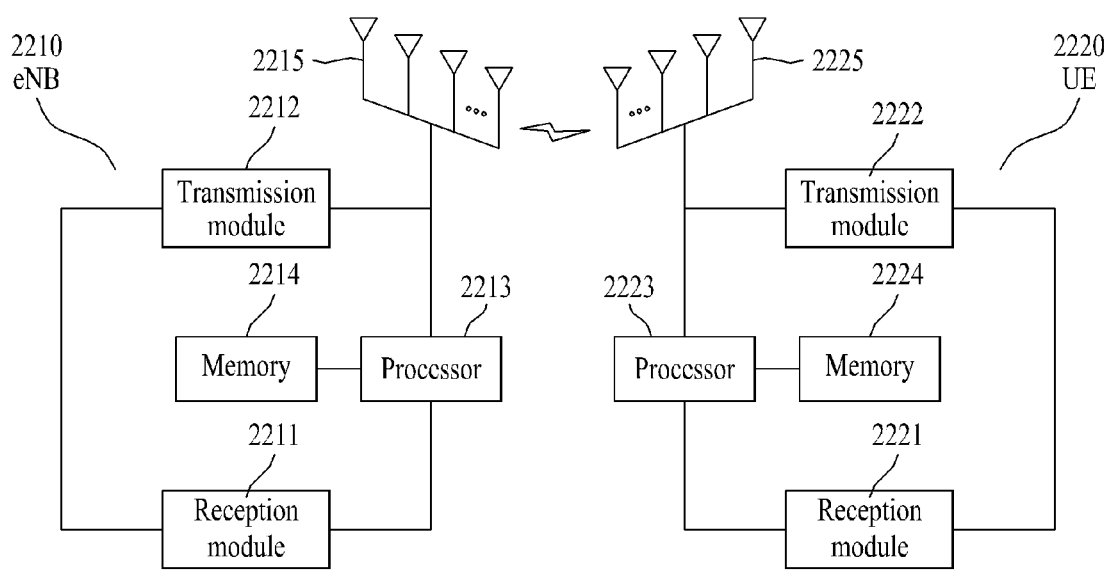
FIG. 22 is a diagram illustrating a base station and a user equipment according to the embodiment of the present invention.

FIG. 22 is a diagram illustrating a base station and a user equipment according to the embodiment of the present invention.

Referring to FIG. 22, the base station 2210 according to the present invention may include a reception module 2211, a transmission module 2212, a processor 2213, a memory 2214, and a plurality of antennas 2215. The plurality of antennas 2215 mean the base station that supports MIMO transmission and reception. The reception module 2211 may receive various signals, data, and information on the uplink from the user equipment. The transmission module 2212 may transmit various signals, data, and information on the downlink to the user equipment. The processor 2213 may control the overall operation of the base station 2210.

The base station 2210 according to one embodiment of the present invention may be configured to receive uplink control information. The processor 2213 of the base station may be configured to transmit allocation information for allocating a plurality of PUCCH transmission resources to the user equipment, to the user equipment 2220 through the transmission module 2212. In this case, each of the plurality of PUCCH transmission resources is configured by combination of information resource (or data resource) and RS resource, and a plurality of RS resources may be allocated to one user equipment. For example, the plurality of RS resources may equally be allocated to a plurality of user equipments (that is, a plurality of RS resources may be shared by a plurality of user equipments), and as detailed examples thereof, the description in the aforementioned embodiment 4 may be used. Also, the processor 2213 may be configured to receive ACK/NACK information, RS and additional control information, which are transmitted from the user equipment 2220 through a specific information resource and a specific RS resource among a plurality of PUCCH transmission resources, through the reception module 2211. In this case, the additional control information may be indicated on the basis of selection of a specific RS resource to which RS is transmitted, among the plurality of RS resources. As detailed examples for expressing the additional control information based on selection of the RS resource, the matters described in the aforementioned embodiment 3 may be used.

In addition, the processor 2213 of the base station 2210 may perform operation process of information received by the base station 2210 and information to be transmitted to the outside, and the memory 2214 may store the operation processed information for a predetermined time and may be replaced with a buffer (not shown).

Referring to FIG. 22, the user equipment 2220 according to the present invention may include a reception module 2221, a transmission module 2222, a processor 2223, a memory 2224, and a plurality of antennas 2225. The plurality of antennas 2225 mean the user equipment that supports MIMO transmission and reception. The reception module 2221 may receive various signals, data, and information on the downlink from the base station. The transmission module 2222 may transmit various signals, data, and information on the uplink to the base station. The processor 2223 may control the overall operation of the user equipment 2220.

The user equipment 2220 according to one embodiment of the present invention may be configured to transmit uplink control information. The processor 2223 of the user equipment may be configured to receive allocation information for allocating a plurality of PUCCH transmission resources to the user equipment 2220, from the base station 2210 through the reception 2221. In this case, each of the plurality of PUCCH transmission resources is configured by combination of information resource (or data resource) and RS resource, and a plurality of RS resources may be allocated to the user equipment 2220. For example, the plurality of RS resources allocated to the user equipment may equally be allocated to the other user equipments (that is, a plurality of RS resources may be shared by a plurality of user equipments), and as detailed examples thereof, the description in the aforementioned embodiment 4 may be used. Also, the processor 2223 may be configured to transmit ACK/NACK information, RS and additional control information to the base station 2210 through a specific information resource and a specific RS resource among the plurality of PUCCH transmission resources, through the transmission module 2222. In this case, the additional control information may be indicated on the basis of selection of a specific RS resource to which RS is transmitted, among the plurality of RS resources. As detailed examples for expressing the additional control information based on selection of the RS resource, the matters described in the aforementioned embodiment 3 may be used.

In addition, the processor 2223 of the user equipment 2220 may perform operation process of information received by the user equipment 2220 and information to be transmitted to the outside, and the memory 2224 may store the operation processed information for a predetermined time and may be replaced with a buffer (not shown).

The matters described in the aforementioned various embodiments of the present invention may independently be applied to the detailed configuration of the base station and the user equipment, or two or more embodiments may be applied to the detailed configuration of the base station and the user equipment. The repeated description will be omitted for clarification.

Also, the description of the base station 2210 in the description of FIG. 22 may equally be applied to the relay station as the downlink transmitting entity or the uplink receiving entity, and the description of the user equipment 2220 may equally be applied to the relay station as the downlink receiving entity or the uplink transmitting entity.

The aforementioned embodiments according to the present invention may be implemented by various means, for example, hardware, firmware, software, or their combination.

If the embodiment of the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. It is also obvious to those skilled in the art that claims that are not explicitly cited in each other in the appended claims may be presented in combination as an embodiment of the present invention or included as a new claim by a subsequent amendment after the application is filed.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned embodiments of the present invention may be applied to various mobile communication systems.

The invention claimed is:

1. A method for a base station receiving uplink control information from a user equipment, the method comprising:
    transmitting allocation information to the user equipment, the allocation information allocating a plurality of physical uplink control channel (PUCCH) transmission resources, which include a plurality of reference signal (RS) resources, to the user equipment, each of the PUCCH transmission resources being configured by a combination of an information resource and a reference signal (RS) resource; and
    receiving positive acknowledgement/negative acknowledgement (ACK/NACK) information, an RS and additional control information, which are transmitted from the user equipment through a specific information resource and a specific RS resource among the plurality of PUCCH transmission resources,
    wherein the additional control information is a scheduling request (SR),
    wherein a state of the additional control information is indicated based on a selection made by the user equipment of the specific RS resource to which the RS is transmitted, among the plurality of RS resources,
    wherein a first state of the additional control information representing that the SR is unsolicited from the user equipment is indicated when the specific RS resource is a first RS resource of the plurality of RS resources, and
    wherein a second state of the additional control information representing that the SR is solicited from the user equipment is indicated when the specific RS resource is a second RS resource of the plurality of RS resources.

2. The method according to claim 1,
    wherein one RS resource is determined by a combination of a location of a resource block (RB) to which the RS is transmitted, a cyclic shift (CS) value applied to the RS in a frequency domain, and an orthogonal spreading code (OC) applied to the RS in a time domain, and
    wherein at least one of the RB, the CS and the OC is differently given for each of the plurality of RS resources.

3. The method according to claim 1, wherein the plurality of RS resources allocated to the user equipment are allocated to at least one other user equipment.

4. A method for a user equipment transmitting uplink control information to a base station, the method comprising:
    receiving allocation information from the base station, the allocation information allocating a plurality of physical uplink control channel (PUCCH) transmission resources, which include a plurality of reference signal (RS) resources, to the user equipment, each of the PUCCH transmission resources being configured by a combination of an information resource and a reference signal (RS) resource; and
    transmitting positive acknowledgement/negative acknowledgement (ACK/NACK) information, an RS and additional control information to the base station through a specific information resource and a specific RS resource among the plurality of PUCCH transmission resources,
    wherein the additional control information is a scheduling request (SR),
    wherein a state of the additional control information is indicated based on a selection made by the user equipment of the specific RS resource to which the RS is transmitted, among the plurality of RS resources,
    wherein a first state of the additional control information representing that the SR is unsolicited from the user equipment is indicated when the specific RS resource is a first RS resource of the plurality of RS resources, and
    wherein a second state of the additional control information representing that the SR is solicited from the user equipment is indicated when the specific RS resource is a second RS resource of the plurality of RS resources.

5. The method according to claim 4,
    wherein one RS resource is determined by a combination of a location of a resource block (RB) to which the RS is transmitted, a cyclic shift (CS) value applied to the RS in a frequency domain, and an orthogonal spreading code (OC) applied to the RS in a time domain, and
    wherein at least one of the RB, the CS and the OC is differently given for each of the plurality of RS resources.

6. The method according to claim 4, wherein the plurality of RS resources allocated to the user equipment are allocated to at least one other user equipment.

7. A base station receiving uplink control information, the base station comprising:
    a transmission module configured to transmit a downlink signal to a user equipment;
    a reception module configured to receive an uplink signal from the user equipment; and
    a processor configured to control the reception module and the transmission module,
    wherein the processor is further configured to transmit allocation information to the user equipment through the transmission module, the allocation information allocating a plurality of physical uplink control channel (PUCCH) transmission resources, which include a plurality of reference signal (RS) resources, to the user equipment, each of the PUCCH transmission resource being configured by a combination of an information resource and a reference signal (RS) resource,
    wherein the processor is further configured to receive positive acknowledgement/negative acknowledgement (ACK/NACK) information, an RS and additional control information, which are transmitted from the user equipment through a specific information resource and a specific RS resource among the plurality of PUCCH transmission resources, through the reception module,
    wherein the additional control information is a scheduling request (SR), wherein a state of the additional control information is indicated based on a selection made by the user equipment of the specific RS resource to which the RS is transmitted, among the plurality of RS resources, wherein a first state of the additional control information representing that the SR is unsolicited from the user equipment is indicated when the specific RS resource is a first RS resource of the plurality of RS resources, and wherein a second state of the additional control information representing that the SR is solicited from the user equipment is indicated when the specific RS resource is a second RS resource of the plurality of RS resources.

8. A user equipment transmitting uplink control information, the user equipment comprising:

a transmission module configured to transmit an uplink signal to a base station;

a reception module configured to receive a downlink signal from the base station; and a processor configured to control the reception module and the transmission module, wherein the processor is further configured to receive allocation information from the base station through the reception module, the allocation information allocating a plurality of physical uplink control channel (PUCCH) transmission resources, which include a plurality of reference signal (RS) resources, to the user equipment, each of the PUCCH transmission resources being configured by a combination of an information resource and a reference signal (RS) resource, wherein the processor is further configured to transmit positive acknowledgement/negative acknowledgement (ACK/NACK) information, an RS and additional control information to the base station through a specific information resource and a specific RS resource among the plurality of PUCCH transmission resources, through the transmission module, wherein the additional control information is a scheduling request (SR), wherein a state of the additional control information is indicated based on a selection made by the user equipment of the specific RS resource to which the RS is transmitted, among the plurality of RS resources, wherein a first state of the additional control information representing that the SR is unsolicited from the user equipment is indicated when the specific RS resource is a first RS resource of the plurality of RS resources, and wherein a second state of the additional control information representing that the SR is solicited from the user equipment is indicated when the specific RS resource is a second RS resource of the plurality of RS resources.

* * * * *